(12) United States Patent
Zhao et al.

(10) Patent No.: US 9,141,911 B2
(45) Date of Patent: Sep. 22, 2015

(54) APPARATUS AND METHOD FOR AUTOMATED DATA SELECTION IN MODEL IDENTIFICATION AND ADAPTATION IN MULTIVARIABLE PROCESS CONTROL

(71) Applicant: Aspen Technology, Inc., Burlington, MA (US)

(72) Inventors: Hong Zhao, Sugar Land, TX (US); Magiel J. Harmse, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 280 days.

(21) Appl. No.: 13/890,818

(22) Filed: May 9, 2013

(65) Prior Publication Data

US 2013/0246316 A1     Sep. 19, 2013

Related U.S. Application Data

(63) Continuation-in-part of application No. 12/786,052, filed on May 24, 2010, now Pat. No. 8,560,092.

(60) Provisional application No. 61/646,096, filed on May 11, 2012, provisional application No. 61/217,370, filed on May 29, 2009.

(51) Int. Cl.
*G06N 5/02*     (2006.01)
*G05B 13/04*    (2006.01)

(52) U.S. Cl.
CPC ............... *G06N 5/02* (2013.01); *G05B 13/048* (2013.01)

(58) Field of Classification Search
CPC ....................................................... G06N 5/04
USPC .......................................................... 706/47
See application file for complete search history.

(56) References Cited

U.S. PATENT DOCUMENTS 6,056,781 A * 5/2000 Wassick et al. ................. 703/12
6,819,964 B2  11/2004 Harmse et al.
(Continued)

FOREIGN PATENT DOCUMENTS

GB      2409293 A     6/2005
JP      06-187004     7/1994
(Continued)

OTHER PUBLICATIONS

Zhao et al ("An Identification Approach to Nonlinear State Space Model for Industrial Multivariable Model Predictive Control" 1998).*

(Continued)

*Primary Examiner* — Lut Wong
(74) *Attorney, Agent, or Firm* — Hamilton, Brook, Smith & Reynolds, P.C.

(57) ABSTRACT

A computer-based apparatus and method for automated data screening and selection in model identification and model adaptation in multivariable process control is disclosed. Data sample status information, PID control loop associations and internally built MISO (Multi-input, Single-output) predictive models are employed to automatically screen individual time-series of data, and based on various criteria bad data is automatically identified and marked for removal. The resulting plant step test/operational data is also repaired by interpolated replacement values substituted for certain removed bad data that satisfy some conditions. Computer implemented data point interconnection and adjustment techniques are provided to guarantee smooth/continuous replacement values.

19 Claims, 21 Drawing Sheets

(56) References Cited

U.S. PATENT DOCUMENTS

| | | | |
|---|---|---|---|
| 6,937,966 | B1 | 8/2005 | Hellerstein et al. |
| 7,085,615 | B2 | 8/2006 | Persson et al. |
| 7,209,793 | B2 | 4/2007 | Harmse et al. |
| 7,213,007 | B2 | 5/2007 | Grichnik |
| 7,330,804 | B2 | 2/2008 | Turner et al. |
| 8,560,092 | B2 | 10/2013 | Zheng et al. |
| 2007/0225835 | A1 | 9/2007 | Zhu |
| 2008/0183311 | A1 | 7/2008 | MacArthur et al. |
| 2011/0130850 | A1 | 6/2011 | Zheng et al. |
| 2013/0204403 | A1 | 8/2013 | Zheng et al. |

FOREIGN PATENT DOCUMENTS

| | | |
|---|---|---|
| JP | 2005-202934 | 7/2005 |
| JP | 2009-516301 | 4/2009 |
| WO | WO 2008/119008 A1 | 10/2008 |

OTHER PUBLICATIONS

Qina et al ("A survey of industrial model predictive control technology" 2003).*

Notification of Transmittal of the International Search Report and Written Opinion of the International Searching Authority mailed Dec. 5, 2013, for International Application No. PCT/US2013/040363 filed May 9, 2013, entitled "Apparatus and Method for Automated Data Selection in Model Identification and Adaption in Multivariable Process Control".

Notification Concerning Transmittal of International Preliminary Report on Patentability, mailed Nov. 20, 2014, entitled "Apparatus and Method for Automated Data Selection in Model Identification and Adaptation in Multivariable Process Control".

* cited by examiner

«APPARATUS AND METHOD FOR AUTOMATED DATA SELECTION IN MODEL IDENTIFICATION AND ADAPTATION IN MULTIVARIABLE PROCESS CONTROL»

RELATED APPLICATION

This application claims the benefit of U.S. Provisional Application No. 61/646,095, filed on May 11, 2012, and is a continuation-in-part of U.S. application Ser. No. 12/786,052, filed on May 24, 2010, which claims the benefit of U.S. Provisional Application No. 61/217,370, filed on May 29, 2009. The entire teachings of the above applications are incorporated herein by reference.

BACKGROUND OF THE INVENTION

Multivariable Predictive Control (MPC) is the most widely used advanced process control technology in process industries, with more than 5,000 worldwide applications currently in service. MPC, which is sometimes also referred to as multivariate control (MVC), employs a model predictive controller that relies on dynamic models of an underlying process, e.g., linear models obtained by system identification.

A common and challenging problem is that MPC control performance degrades with time due to inevitable changes in the underlying subject process, such as equipment modifications, changes in operating strategy, feed rate and quality changes, de-bottlenecking, instrumentation degradation, etc. Such degradation of control performance results in loss of benefits. Among all possible causes of control performance degradation, the process model's predictive quality is the primary factor in most cases. To sustain good control performance, the model's predictive quality needs to be monitored, and the model needs be periodically audited and updated.

To address the technically challenging problem of model quality auditing and online model identification and adaptation, the Assignee developed an innovative approach for model quality estimation and model adaptation (see U.S. Patent Application Publication No. US 2011/0130850 A1, the parent related application), and a new method for non-invasive closed loop step testing (see U.S. Provisional Application No. 61/596,459, filed on Feb. 8, 2012) that expanded the automated closed loop step testing techniques in Assignee's U.S. Pat. Nos. 7,209,793 and 6,819,964. Each of the above techniques help in monitoring model quality and generating informative plant test data in a more efficient way. Once the process data becomes available through either open/closed-loop plant tests or historical plant operation records, a necessary and also important step is data screening and selection for model quality estimation and model identification. There are two important reasons for performing data screening and selection. First, the process data received from open/closed-loop plant tests are costly due to not only the engineer's work during the designed plant testing, but also the intervention (interruption) to plant production. Therefore the usage of those plant test data should be maximized. Second, collected process time series data may contain segments of samples over periods such as unit/equipment shut-downs, measurement equipment errors, variable values at High/Low limits, control output saturated or frozen, etc. If these data are included in the calculation of model quality estimation or model identification, the results can be contaminated and become unreliable.

In industrial practice of the prior art, a control engineer spends hours to days viewing all the process variables in time series plots and visually finding those data samples unsuitable for model identification purpose. To exclude the found "bad" data samples, the control engineer manually marks such data segments in software as "bad data slices" through a pertinent user interface. For confirmation and double-check on whether there are any "bad data" missed manual slicing, the engineer tries a number of model identification runs until the identification algorithm goes through all the data without failures and the resulting models look normal and make sense from the engineer's view. A typical APC project may contain 50-200 process time series variables and the data collection window may cover a period of weeks to months. Conducting the data screening and selection task by hand may take an experienced engineer days to weeks of intensive work.

In addition, there are two other shortcomings by using the conventional approach to data screening and selection for model quality estimation and identification. One is that any of the marked "bad data slices" in a time series will cause a data loss of a large piece of good data (e.g., one time to steady state (TTSS) for a FIR model and 40-60 samples for a subspace model) following the "bad data slice", as a side effect due to the required re-initialization. The other drawback is that a conventional approach is not suitable for frequent runs in an online application (such as that described in U.S. Patent Application Publication No. US 2011/0130850 A1) where a pre-scheduled automated data screening and selection operation is needed to serve plant testing monitoring. Once a process variable hits its High/Low limit, becomes saturated, or loses measurements, the automated data screening and selection module should alert the operator and report the situation timely, so that the engineer may take actions to make corrections/adjustments and avoid a time and data loss on the plant testing.

There have been some general data preprocessing methods reported in process model identification text books (e.g., Lennart Ljung, "System Identification—Theory for The Users" Second Edition, Prentice Hall, 1999), but there is no systematical method for automated data screening and selection. A recently reported method of data selection from historic data for model identification (Daniel Peretzki, Alf J. Isaksson, Andre Carvalho Bittencourt, Krister Forsman, "Data Mining of Historic Data for Process Identification", AIChE Annual Meeting, 2011) is focused on finding useful intervals by use of a Laguerre approximation model and limited to only single-input and single-output (SISO) PID (Proportional-Integral-Derivative Controller) loops. In industrial APC practice, based on Applicants' knowledge, automated data screening and selection has been APC (Process Control) engineers' "dream", where neither systematic solution nor commercial tools are available yet.

SUMMARY OF THE INVENTION

The innovation presented by Applicants herein address the above issues in the art. Applicants provide a new apparatus and method for automated data selection in model quality estimation and identification in multivariable process control.

Embodiments of the present invention provide a new apparatus and method to address the foregoing problems by (1) detecting and excluding datasets that are unsuitable for model quality estimation and model identification, and (2) repairing and patching certain datasets to maximize usage of data in an MPC application.

Embodiments provide expansion of the model quality estimation and model adaptation method in multivariable process control described by Assignee in:

Related parent patent application, U.S. Publication No. US 2011/0130850 A1, published on Jun. 2, 2011, U.S. application Ser. No. 13/760,949 Filed Feb. 6, 2013 (claiming the benefit of U.S. Provisional Application No. 61/596,459, filed on Feb. 8, 2012), and U.S. Pat. No. 7,209,793, issued on Apr. 24, 2007, each incorporated herein by reference in their entirety. Embodiments can be configured and executed to screen and select data for model quality estimation and model identification while minimizing negative impact of the undesirable data and maximizing the overall usage of available process data.

Embodiments provide several new automated data screening and selection techniques to select data suitable for model assessment and model re-identification.

Embodiments provide an innovative approach to testing and validating bad data segments found, which can help to minimize data loss.

Embodiments provide a novel technique to repair and patch certain bad data samples via an internal MISO (Multi-Input, Single-Output) model predictive method, which helps replace some bad data samples with model-based predictive values. In turn, this technique maximizes the overall data usage.

An embodiment is an apparatus comprising a four-tier automated data screening and selection system that can be configured and execute with a hierarchy and work flow as shown in FIG. 2.

An example embodiment of the present invention is method of screening and selecting data automatically for model identification and model adaptation in a multivariable predictive controller (MPC). Given an online controller having an existing model, the method includes loading process data from a subject process and storing the process data in a database accessible by said model, using a rule-based data selector for detecting and excluding data segments of stored process data that are unsuitable for model quality estimation and for model identification, validating the excluded data segments to minimize the data loss from bad data segments being excluded, repairing certain data segments of the stored process data to maximize usage of data in a MPC application; and updating the existing model using resulting process data as stored in the database.

An embodiment includes three different methods/modules of data screening and selecting and one data repairing method/module to serve as the automated data selection apparatus. These methods/modules are summarized as follows:

1. Data Quality Based Basic Data Screen and Selection Method: Data segments are screened and invalid data are detected and marked as "bad" for exclusion based on online data quality status, data measurement availability, individual variable or controller on/off switching, and process events etc.
2. PID Control Loop Association Based Method: Variables are grouped according to their associated PID control loops. For each PID loop, process variables (PV) are compared against their corresponding set points (SP). All PV data showing significant deviations from their SP, such as auto-off-mode, measurement frozen, spikes due to unknown disturbances and PID in manual mode etc., are marked as "bad data slices" and these data segments are sliced out (or otherwise filtered) from the datasets before running model quality estimation and model identification.
3. Model Predictive Method: For those dependent variables that have no PID associations, an internal model is built to generate dependent predictions by using the available independent variables' measurements. Then (1) model predictions are evaluated against their measurements, and (2) spikes and significant deviations in moving trends are assessed. The evaluated and assessed data may be marked as "bad data slices" and thus excluded from the dataset for model quality estimation and identification.
4. Bad Data Repairing Method: In model identification, once a "bad data" segment (slice) is excluded from the dataset, an initialization of the identification algorithm causes a data loss of about a length of 40-60 data samples in the good data segment following the marked "bad data" slice. To avoid losing too many good data points, an interpolation method of the present invention is applied to all short data segments (slices) by replacing rather than deleting their measurements with interpolated values.

In an embodiment, using rule-based data selector for detecting and excluding data segments of process data that are unsuitable for model quality estimation and for model identification includes the steps of:

a. Collecting process data variables and storing collected process data variables in the database at a given sampling frequency as time series variables.

b. Loading data status, special values, and value limits of variables of the subject process with their corresponding time series from the database.

c. Screening a given time series variable as a dependent process variable or an independent process variable and apply basic data screening filters to detect and mark data segments of the time series as Good Data or Bad Data according to given data quality measurement parameters.

d. Grouping time series variables according to their associated proportional-integral-derivative (PID) loops.

e. Comparing process variables (PV) against their corresponding set points (SP) in each PID loop and applying data screening filters.

f. Generating predictions for dependent variables without a PID association using available independent variable measurements.

g. Evaluating the generated predictions for dependent variables without a PID association against corresponding available dependent variable measurements and applying data screening methods.

h. Identifying and generating Bad Data slices in the given time series variable using the data segments marked as Bad Data and a data slice generator to exclude the Bad Data segments from the time series.

In an embodiment, validating excluded data segments to minimize the data loss from bad data segments being excluded includes the steps of:

i. Testing Bad Data segments of the time series not removed by a basic data filter by comparing the model qualities (MQ) when the Bad Dada segments are included and excluded in the model identification.

j. Confirming Bad Data segments as Bad Data based on the MQ comparison, otherwise unmarking candidate Bad Data segments.

In an embodiment, repairing certain time series to maximize usage of data in a MPC application includes the steps of:

k. For the given time series variable, selecting all confirmed Bad Data segments with length less than a half time to steady-state (TTSS) for interpolation.

l. Patching segments in the time series where data portions have been removed by the data slice generator with interpolated data segments.

m. Minimizing the negative impacts of replacing Bad Data segments with interpolated data segments by patching Bad Data slices with their interpolated slices with a smooth connection between the end points of a interpolated data segments.

In some embodiments, the process data variables of step (a) includes manipulated variables (MVs), measurements of control variables (CVs) of the subject process, calculated values of independent variables, calculated values of dependent variables, all data vectors of the subject process, and all PID controller loops.

In some embodiments, the basic data screening methods of step (c) include a PID controller output (OP) saturation and High/Low limit detector, a frozen signal/measurement detector if the given time series is a dependent variable, and a PID manual mode detector if the given time series is an independent variable.

In an embodiment, comparing process variables (PV) against their corresponding set points (SP) in each PID look and applying data screening filters is performing a PID loop association search and finding available SP, PV, and OP among all process variables, determining whether a PV and SP pair or a PV, SP and control output (OP) triple are associated with the time series in a PID loop, and, if PV and SP pair or PV, SP and OP triple is associated with the time series in the same PID loop, using a rule-based data selector to apply data screening filters to detect data sequences showing deviations from their SP and marking the corresponding segments of data as Bad Data.

In an embodiment, the data screening filters include a PV spike detector if the given time series is a dependent variable, a PID manual mode detector, and a SP in closed-loop mode detector if the given time series is an independent variable. An embodiment of evaluating the generated predictions for dependent variables without a PID association against their measurements and applying data screening filters (step (g)) is, if no PV and SP pair or PV, SP and OP triple is associated with the current time series variable in the same PID loop and the time series variable is a dependent process variable, using data screening filters to detect data segments showing spikes and deviations in moving trend and marking the corresponding segments of data as Bad Data according to given data screening filters. The data screening filters can include a PV spike detector and a trend mismatch/unknown disturbances detector.

In some embodiments, the trend mismatch/unknown disturbances detector includes generating a model prediction of the time series variable via a multiple-input single-output (MISO) model, calculating a prediction error for unknown disturbances, detecting if a control variable (CV) time series does not parallel the predicted MISO model values, detecting if a large sustained shift in the average value of the CV has occurred outside of the normal movement and determining if it is associated with the model prediction, and selecting for exclusion the data segments of the time series variable showing difference in trends beyond the prediction error and making selected data segments as Bad Data.

In another embodiment, testing Bad Data slices includes setting Bad Data segments as Candidate Bad Data segments and generating Good Data segments by excluding Candidate Bad Data segments for each time series variable, for a dependent variable, configuring a multiple-input single-output (MISO) model identification and loading the independent variables as inputs and the dependent variable as output in the MISO model, applying the generated Good Data segments to the configured MISO model and calculating a baseline model quality index (MQ) by performing a model quality assessment on the MISO model, and running a MISO case identification on a Candidate Bad Data segment of the data segments not removed by a basic data filter and calculating a candidate MQ by performing a model quality assessment on the MISO model corresponding to the Candidate Bad Data segment.

In yet another embodiment, confirming Candidate Bad Data segments as Bad Data includes, given a tunable parameter as a threshold, marking Candidate Bad Data segment as a Good Data segment if difference between baseline MQ and candidate MQ is within the tunable threshold and removing corresponding data slices from a list of Bad Data slices.

In another embodiment, patching segments in the time series where data portions have been removed by the data slice generator with interpolated data segments includes, if the time series variable is an independent variable, checking the Good Data segments adjacent to the selected Bad Data segments to determine if the Good Data sample values before a Start Point and after a End Point of a Bad Data segment are within a given threshold, and, if true, creating an interpolation slice by linear interpolation and replacing the selected Bad Data segments with the interpolation slice. If the selected time series variable is a dependent variable, configuring a MISO model case with the dependent variable and associated independent variables, and running a MISO identification case using the resultant MISO model to generate a model prediction on the dependent variable, and creating an interpolated slice for Bad Data segments if model predictive values are available for the Bad Data segment. If the time series variable is a dependent variable, checking the Good Data segments adjacent to the selected Bad Data segments to determine if the calculated average values over a given length before the Start Point and after the End Point of a Bad Data segment are within the given threshold, and if true, creating an interpolation slice by linear interpolation and replacing the selected Bad Data segments with the interpolation slice, the interpolation slice smoothly connected to the Good Data segments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a MPC system diagram that an embodiment of the present invention is applied to.

DETAILED DESCRIPTION OF THE INVENTION

A description of example embodiments of the invention follows.

The teachings of all patents, published applications, and references cited herein are incorporated by reference in their entirety.

Embodiments provide expansion of model quality estimation and model adaptation in multivariable process control techniques described in related parent application (U.S. Patent Application Publication No. US 2011/0130850 A1 by Assignee). Embodiments can be configured and executed to screen and select required data for model quality assessment and/or model re-identification in the systems of the parent disclosure, while minimizing the intensive work on data selection and preparation commonly done by a process control engineer manually. Accordingly, the present invention provides an improvement over the prior state of the art.

Embodiments provide a new apparatus and method for screening and selecting plant test/operational data automatically for online or offline model identification and online model adaptation in multivariable predictive controller (MPC) applications. Different modes of operation are provided in embodiments, namely: Basic Data Screen mode, PID Loop Data Selection mode, Model Predictive Data Selection mode, Data Slices Validation mode, and Data Repairing mode. Below, an overview of system work flow and system elements are provided, followed by a discussion of operational modes, process modules/methods and mathematical details.

As used herein, the term "data screening and selection" may generally be used synonymously with data filtering, segmentation and the like.

Figure 1:
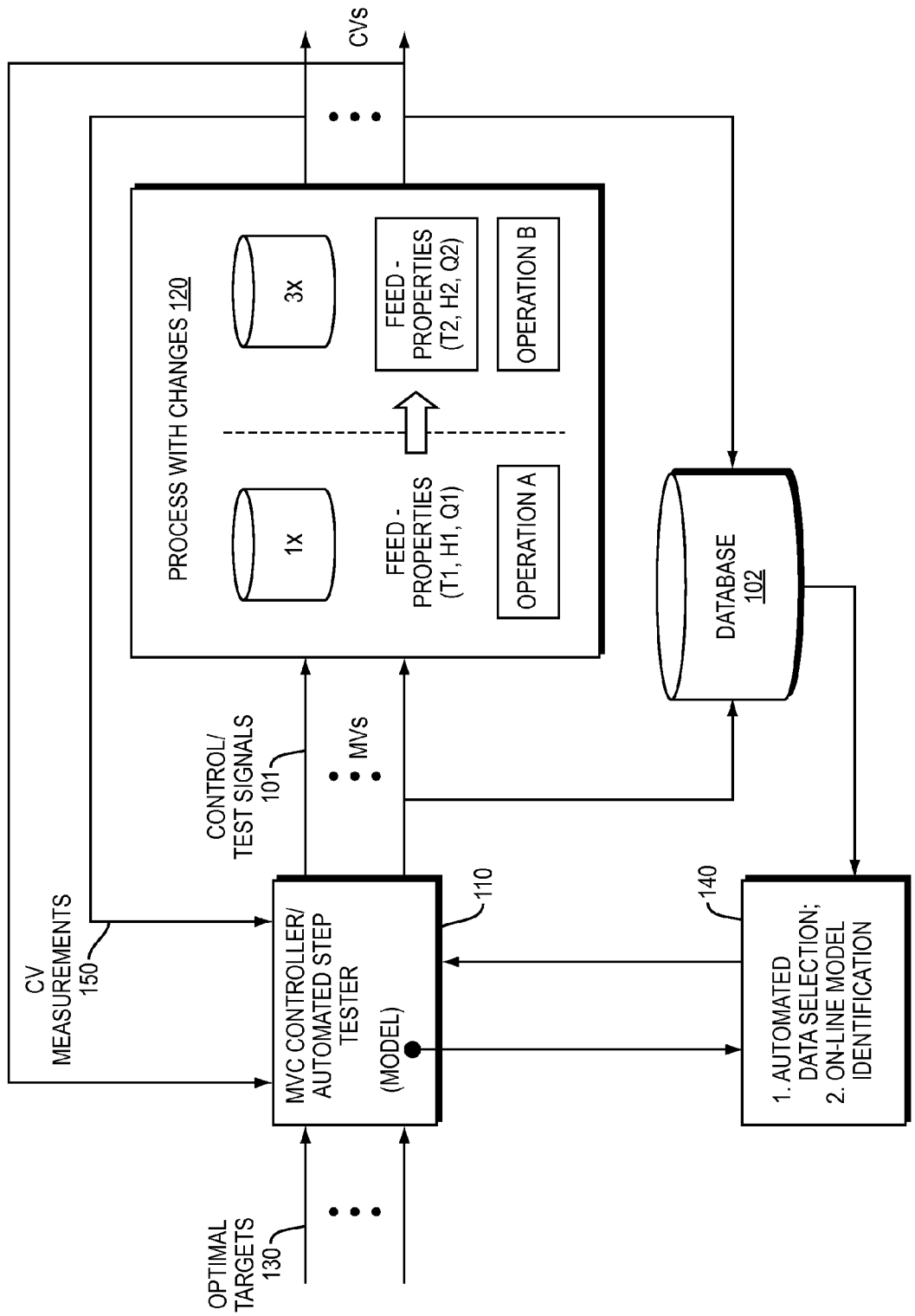

FIG. 1 is a block diagram of a MPC control system embodying the present invention. An MPC controller 110 controls a subject dynamical process 120 (such as that of a processing plant) based on optimal targets 130. The controller 110 includes an automated tester to perturb the process 120 in an embodiment. While FIG. 1 shows the controller and the tester together as 110, it should be understood by one of ordinary skill in the art that in another embodiment, a separate controller and tester may be provided. The controller 110 sends control/test signals 101 that set the values of manipulated variables (MVs) of the subject process 120. The MVs are independent variables in the sense that they can be set as desired to perturb the process and to control the controlled variables (CVs) within their constraints set and operation limits. Measurements of control variables (CVs) 150 resulting after perturbation are fed back to the controller 110. Control variables are so named because they are controlled through the manipulated variables; thus, the CVs are dependent variables that depend on the MVs. A real-time database 102 is used to store historical data regarding the MVs and the corresponding CVs. Although multiple optimal targets 130, MVs, and CVs 150 are shown in FIG. 1, it should be understood that there may be a single optimal target, MV, and/or CV.

An automated data selection and online model identification module 140 selects only the valid and informative data series in segments, and identifies a whole or a subset of the multi-input multi-output (MIMO) model of controller 110 based on selected inputs and outputs data from the process 120 and the database 102. The module 140 may be part of performance diagnostics which diagnose performance of the controller model as described in parent related U.S. patent application Ser. No. 12/786,052 (by Assignee), herein incorporated by reference in its entirety. In turn, module 140 updates (adapts) the model to improve performance.

Figure 2:
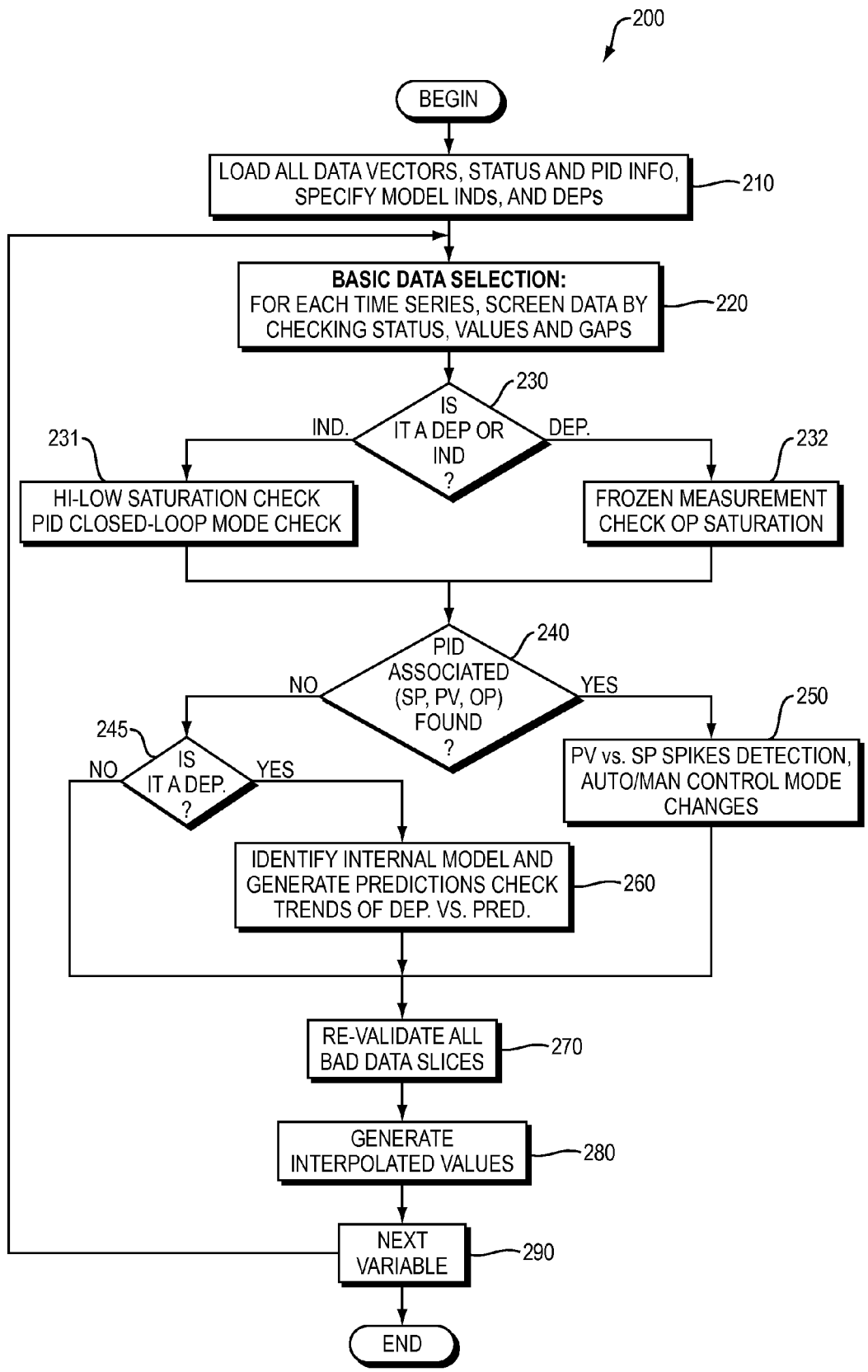
FIG. 2 is a workflow diagram of the automated data screening and data selection apparatus of FIG. 1.

FIG. 2 is a flow diagram depicting the major work flow in an embodiment of the invention. The automated data screen and selection apparatus 200 starts its operation 210 with loading all controller 110 relevant data sequences or time series. That is, apparatus 200 collects data related to MVs 101 and measurements of CVs 150 and stores the collected data into the database 102 at a specified sampling frequency, usually the same as used by the MPC controller 110. The data may also include calculated values of independent variables and dependent variables collected from process 120 and stored in database 102.

Apparatus 200 executes its task in a sequential way. For each time series (or the sampled values of a variable over time), Basic Data Selection method/module 220 is first applied based on the variable associated data sample quality. In this module 220, all recorded data status, special values and High/Low value limits of variables are loaded into the apparatus 200 together with the time series values. An independent/dependent variable attribute check 230 on this time series of data is performed and corresponding data screening criteria are applied. For instance, if the subject data corresponds to dependent process variables, then method 232 detects data segments with frozen measurements and controller output (OP) saturation (values that have reached the High/

Low limits and stay there for a long time). Method 232 marks the detected data segments as "bad data" slices. If the subject data corresponds to independent process variables, then method 231 detects data samples with High/Low saturation or with set points (SP) in "tracking" process variable (PV) mode. This typically occurs when a PID loop is in manual (MAN) mode. Method 231 then selects the detected data segment as "bad data" slices for exclusion.

After Basic Data Screening and Selection module/methods 220 described above, the remaining good data segments of the time series is passed to 240 for a PID loop association search among all loaded available time series of data from 210. Decision junction 240 determines whether a PV and SP pair or a PV, SP and OP triple are associated with the current time series in a same PID loop. If so, then a PID loop based data screen and selection method/module 250 starts to execute. If the PV and SP are available, a time series of PID loop control error $\{e(t)\}$ is created and used to detect PV spikes as described later.

In module 250, additional data screening is performed if the selected time series is from a Dep. (dependent process variable) and is also an OP (output) in a PID loop. Once a constant OP value over a time window is detected by screening OP changes, module 250 concludes that the PID loop is in manual mode. In such a case, the unchanged dependent variable may lead to wrong conclusions in model quality estimation or model identification. Therefore, module 250 marks the corresponding segment of data samples as "bad data" slices.

When neither pair nor triple PID associated variables is found in 240, and the selected time series is tested as a Dep. (dependent process variable) in 245, a model predictive data screen and selection module/method 260 is used to further assist detecting unknown disturbances.

An internal multi-input, single-output (MISO) model identification is performed in module 260, where the inputs are those defined independent variables in the controller model and the single output is the currently selected variable (time series). A model prediction of the selected time series is generated via the internally identified MISO model. Corresponding prediction error $\{pe(t)=CV(t)-CVPred(t)\}$ is calculated for unknown disturbances data screening and detection in the work flow.

A module/method that detects when the CV does not show parallel movement to those predicted values is used in 260, and module 260 selects for exclusion those data segments showing significant differences in trends. Module 260 marks the selected data segments as "unknown disturbances."

A bad data slices validation module/method 270 is called after all bad data segments have been created from 210 through 260. Due to the required re-initialization after each "bad data" or excluded data segment (slice) on data assembly for model identification, many good data points can become useless. When the number of "bad" data slices increase, the "good" data samples used for initialization become very "expensive". To reduce this kind of high "cost" initialization, the present invention implements two strategies. One is to re-validate all "candidate" bad data slices by using the Assignee's techniques previously described in the parent related U.S. application Ser. No. 12/786,052 and herein incorporated by reference. In module/method 270, each of the candidate "bad" data slices is tested by comparing the model qualities when the tested "bad" data segment is included in the model identification to that of when the tested "bad" data segment is excluded in the model identification. If the model quality decreases significantly by a measure of MQ (model quality) index, then the tested candidate "bad" data segment is confirmed as "bad". Otherwise, module 270 unmarks the "bad" data segment and removes that data segment from the "bad data slice" list.

Another strategy to minimize the negative impacts created by "bad data slices" is to generate interpolated values patching the short "bad data slices" (i.e., segments where data portions have been removed). A module/method 280 generates MV interpolation values and CV predictions and patches the selected "bad" data slices. Module 280 is formed of two elements, one is a MISO identification engine and the other is an algorithm that patches the short "bad" data slices through a "smooth" connection between the two end-points of two neighborhood good data points. Each of these elements is further detailed below.

The foregoing process 220-280 is repeated on a next variable 290 as illustrated in FIG. 2.

Components of the Apparatus 200

Multiple components for carrying out the above methods of automated data screening and selection are provided in the embodiments. These include:
 a rule-based data selector,
 a data-slice generator,
 a PV spike detector,
 an OP saturation and High/Low limit detector,
 a frozen signal/measurement detector,
 a PID manual mode detector,
 a SP in closed-loop mode detector,
 a trend mismatch/unknown disturbances detector,
 a slice validation module using MQ, and
 a slice reparation/patch module.

Each of these components is configured as follows. It is understood that other components and configurations are in the purview of the skilled artisan given this description.

A Common Rule-Based Data Selector:

To automate the process of data screening and selection in various cases and under different rules/criteria, a common rule-based data marker/selector is provided. For a given time series, a list of data-sample-status-flags are created internally, which memorizes each data sample's status-mark. The status flags can be set for any rule-based criterion. For example, the following rules will "mark" a list of samples' status flags:

TABLE 1

| Status | Criterion | Flag value | Comments/Ref. FIGS. |
|---|---|---|---|
| Good | STA = 0 | 0 | Default value |
| Bad | STA = −1 | −1 | FIG. 4 |
| Off | STA = −2 | −1 | FIG. 4 |
| Invalid value | Value = −9999 | −1 | FIG. 4 |
| Missing value | Value = −10001 | −1 | FIG. 4 |
| Over H/L limits | Value > H limit or Value < L limit | −1 | FIG. 6 |
| OP Saturation | Value = Constant at a H/L operational limits | −1 | FIG. 7 and FIG. 11 |
| Signal Frozen | Value = Constant for a long period, e.g. (T > 1/4TTSS) | −1 | FIG. 8 |
| PV Spikes | $\|e(t)\| > k * STD$ | −1, −2, −3 | FIGS. 9A and 9B |
| SP tracks PV (PID in MAN mode) | SP(t) − PV(t) < ε | −1 | FIG. 12 |
| No SP Step moves | dSP(t) ! = 0 | −1 | FIG. 10 |
| PV_trend ! = SP_trend | dSP(t − k) − dPV(t − k) > γ | −1 | FIG. 13, Unknown disturbances |
| PV_trend ! = PVpred_trend | dPVpred(t − k) − dPV(t − k) > γ | −1 | FIG. 14, 15, Unknown disturbances |

TABLE 1-continued

| Status | Criterion | Flag value | Comments/Ref. FIGS. |
|---|---|---|---|
| Patched with Interpolated Values | | +1 | FIGS. 5 and 16. |

Figure 3:
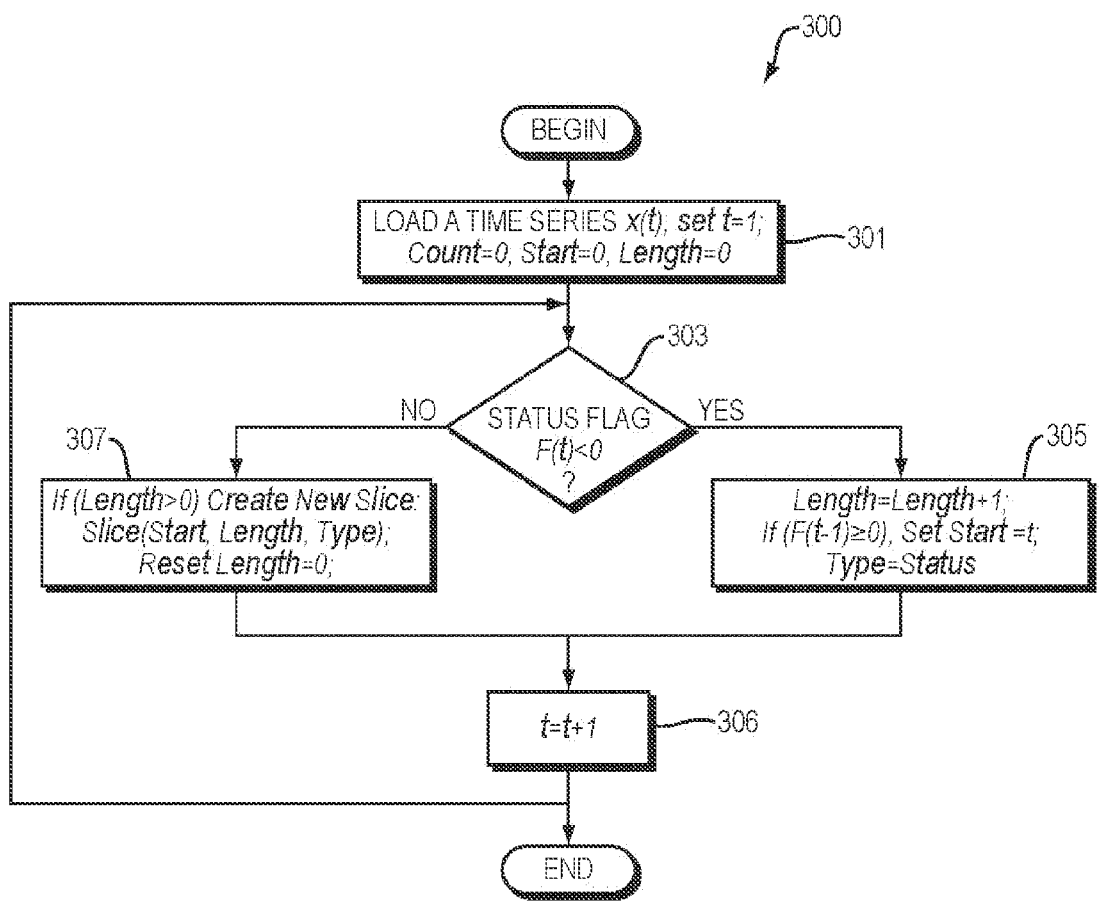
FIG. 3 is a flow diagram of a data slice generator of embodiments.

A Common Data Slice Generator:

Based on the Flag values, continuous "bad data" samples with the same status are converted into (marked as) categorized "bad data" slices. The common data slice generator 300 serves to create all bad data slices under different criteria. FIG. 3 is illustrative of one embodiment of a data slice generator 300.

Data slice generator 300 begins by loading a time series of data x(t) such as that illustrated in FIG. 3 and having a corresponding set of Flag values (i.e., from Table 1) as set by the Rule-based Data Selector. At step 301, data slice generator 300 sets time t=1 and initial values for parameters count, start and length. If a Status Flag value is negative (i.e., less than zero), then decision junction 303 proceeds with steps 305 and 306 which increment through the data points that form the "bad data" slice. If the Status Flag value is non-negative (i.e., zero or positive), then decision junction 303 proceeds with steps 306 and 307 which create/define a new "bad data" slice.

A PV Spike Detector:

If the given time series is a Dep (dependent variable) and it is also a PV (process variable) in a PID loop, then PV spike patterns may be detected. When the corresponding SP (set point) of this time series of data is found available in 240 (FIG. 2), a new time series of control error {e(t)} is calculated by subtracting PV values from SP (i.e., e(t)=SP(t)−PV(t)), and is used for detection of PV spikes due to either instrument measurement error (e.g., short-term offline/reset/calibration) or unknown large disturbances into the process 120. Thus PV Spike Detector looks for and detects data patterns shown in FIGS. 9A-9B and 13.

A statistical calculation on the new time series {e(t)} results in mean $\bar{E}$ and standard deviation $STD_E$:

$$\bar{E} = \frac{1}{M}\sum_{S=1}^{M}\left(\frac{1}{N_S}\sum_{t=1}^{N_S} e(t)\right),$$

$$STD_E = \left(\frac{1}{N-1}\left(\sum_{t=1}^{N_S}(e(t)-\bar{E})^2\right)\right)^{1/2}$$

where the S represents a "good" data segment (also called data slice), $N_S$ and N are the total number of samples of each "good" data segment and of all "good" data segments.

All significant spikes on PV are detected based on the following criterion:

$PV(t)$=spikes, if $|e(t)| \geq k \cdot STD_E$ $k \in (1,6)$ $k_0 = 3.0$;

where $k_0$ is a default value, representing a 3-sigma rule in statistics.

Figure 9A:
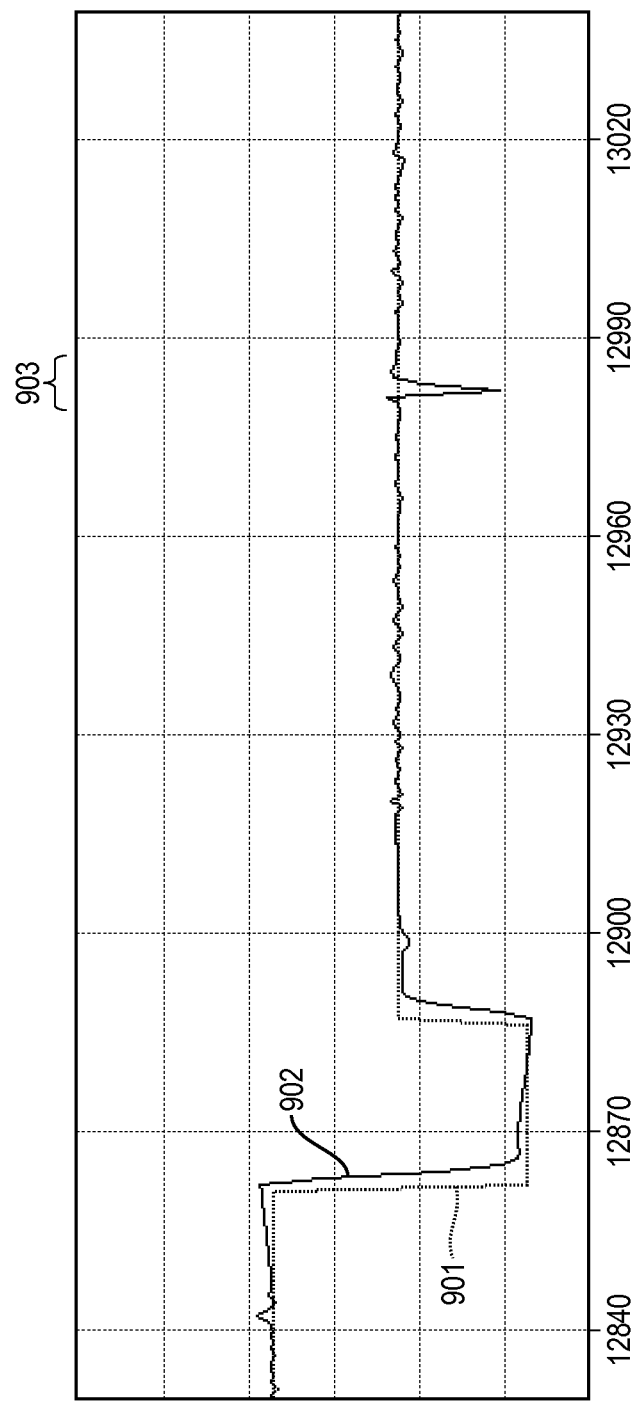
FIGS. 9A and 9B are schematic illustrations of data graphs from which embodiments detect significant spikes, disturbances or changes in operating point in process variables of the PID loops.
Figure 9B:
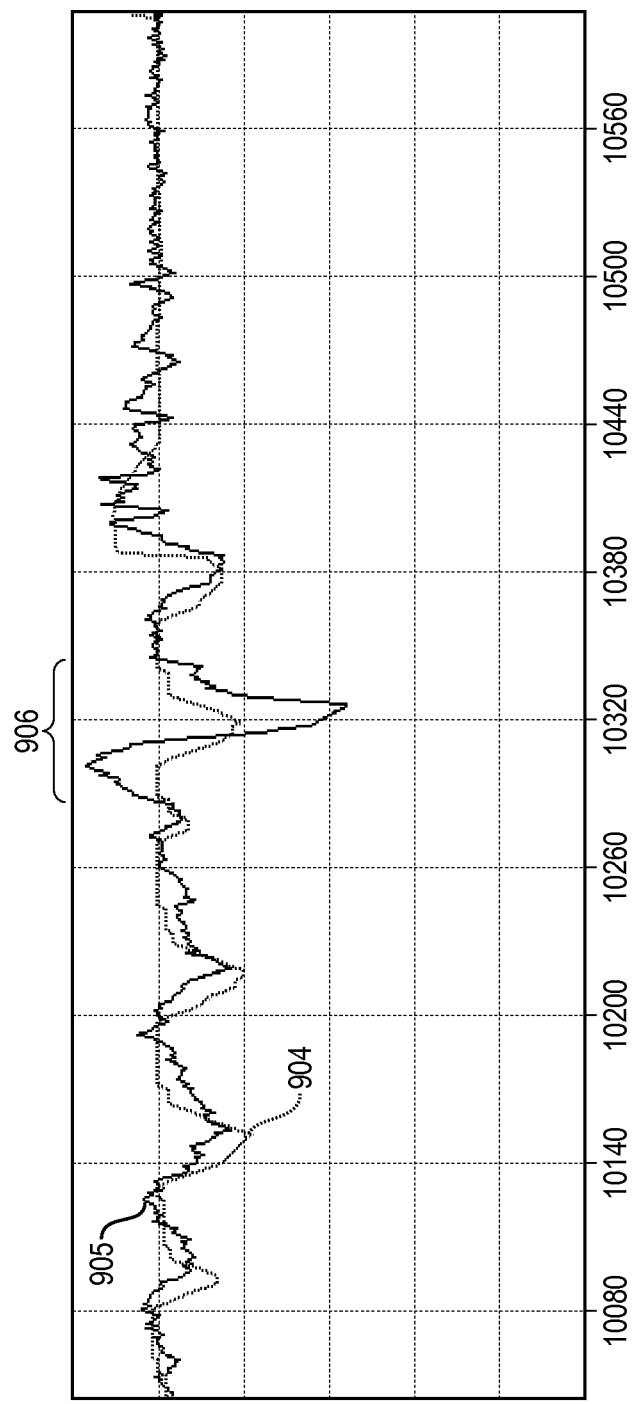

Any data segment detected by the above approach is marked as a "bad data slice" because such data will deteriorate the results of model quality estimation or model re-identification if not excluded. FIG. 9A shows an example of a PV 902 spike detected in data region 903 with associated variable 901. FIG. 9B shows a similar PV 905 spike detected in data region 906 with associated variable 904.

Figure 6:
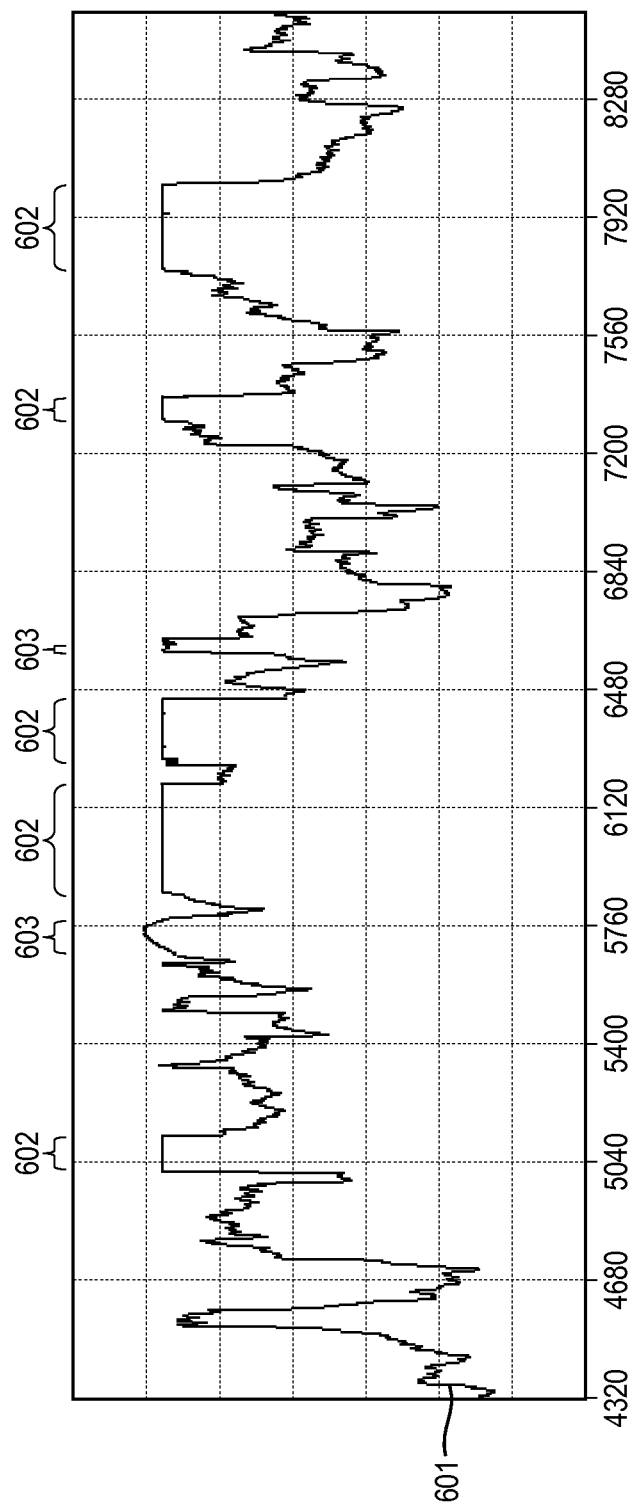
FIG. 6 is a schematic illustration of a data graph having measurement values at their high and low limits that embodiments detect and segment as inappropriate for model identification.
Figure 7:
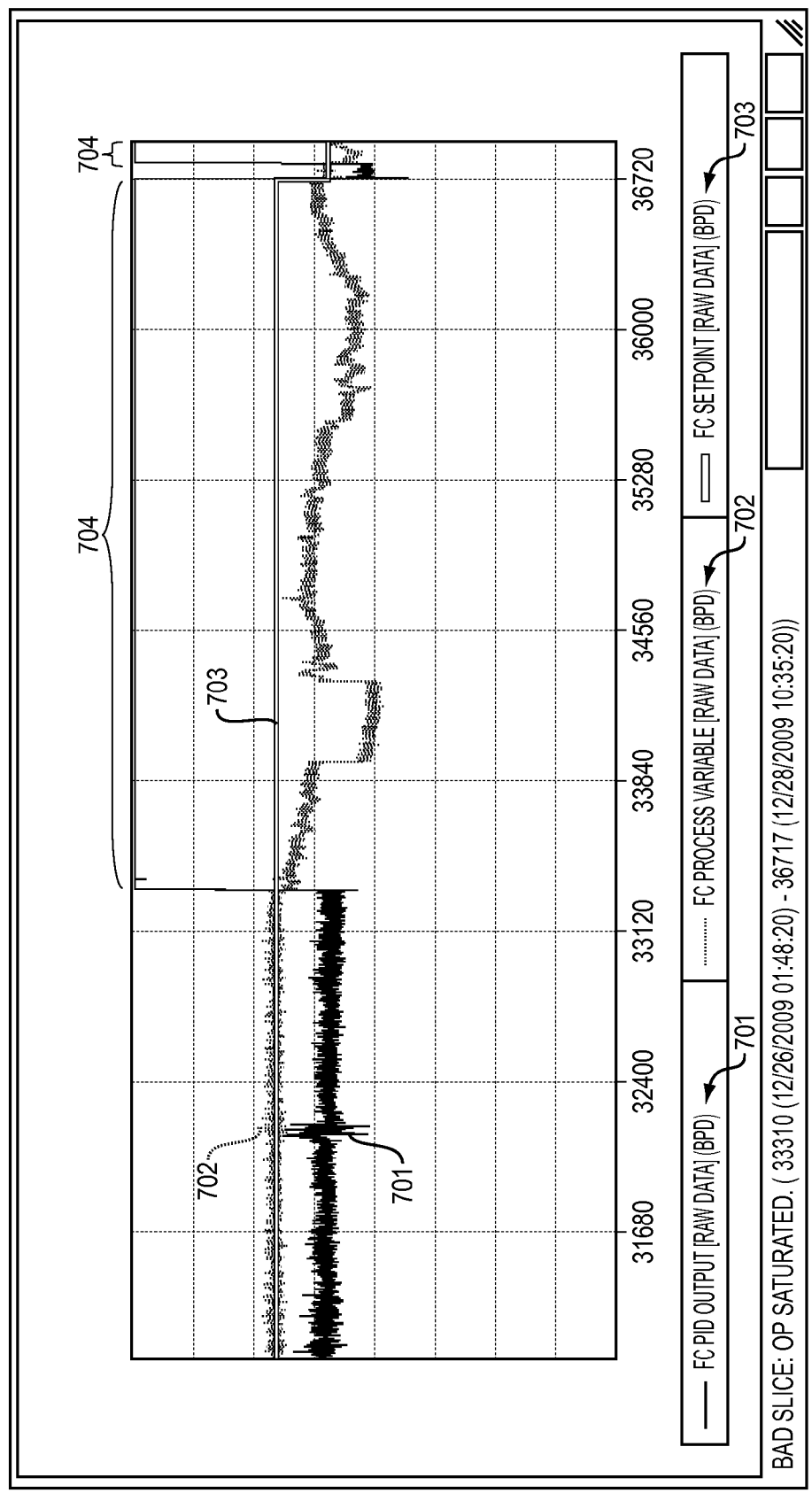
FIG. 7 is a schematic illustration of a data graph from which embodiments detect instrument saturation.
Figure 11:
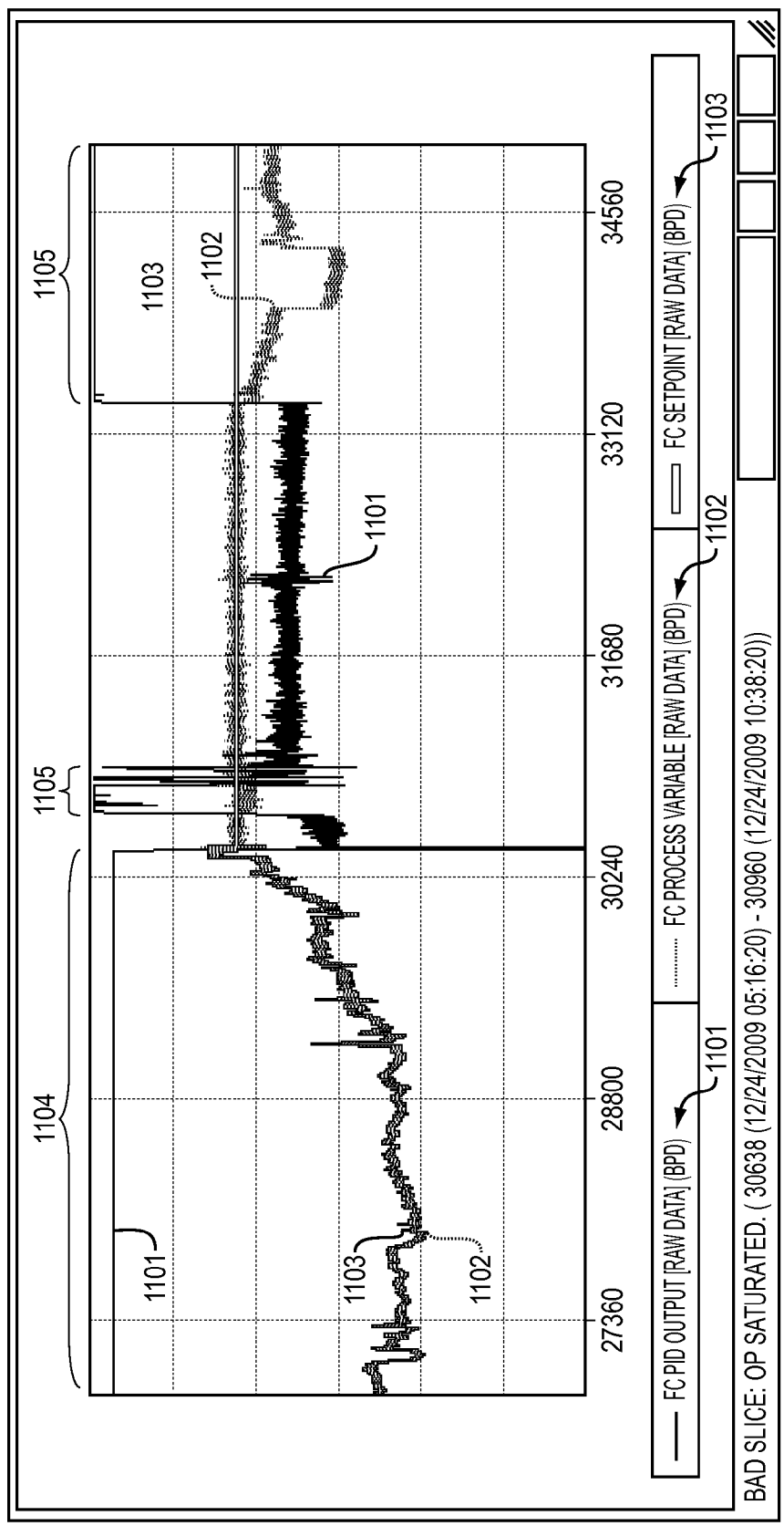
FIG. 11 is a schematic illustration of a data graph from which embodiments detect when a PID loop output is saturated such that a process variable is no longer able to follow the corresponding set point.

An OP Saturation and High/Low Limit Detector:

If the given time series is a Dep (dependent variable), then any data segment at its High/Low limits will no longer be able to represent the causal independent-dependent relations correctly. Therefore, a criterion to check is whether a data value is reaching and staying at a limit value. This criterion is applied to generate corresponding Flag values for model quality estimation or model identification purposes as listed in Table 1. FIGS. 6, 7, and 11 illustrate such a situation with High/Low limit values and OP saturations respectively. FIG. 6 shows a data series 601 with detected data regions 602 where the data series 601 is detected as reaching its high value. FIG. 7 shows time series of a process variable 602 with associated setpoint 603 and output 601, where the output is detected as saturated in data region 604. FIG. 11 shows embodiments detecting when a PID loop output is saturated 1105 when a process variable 1102 is no longer able to follow the corresponding set point 1103 (as opposed to data region 1104), such that output 1101 becomes saturated.

Figure 8:
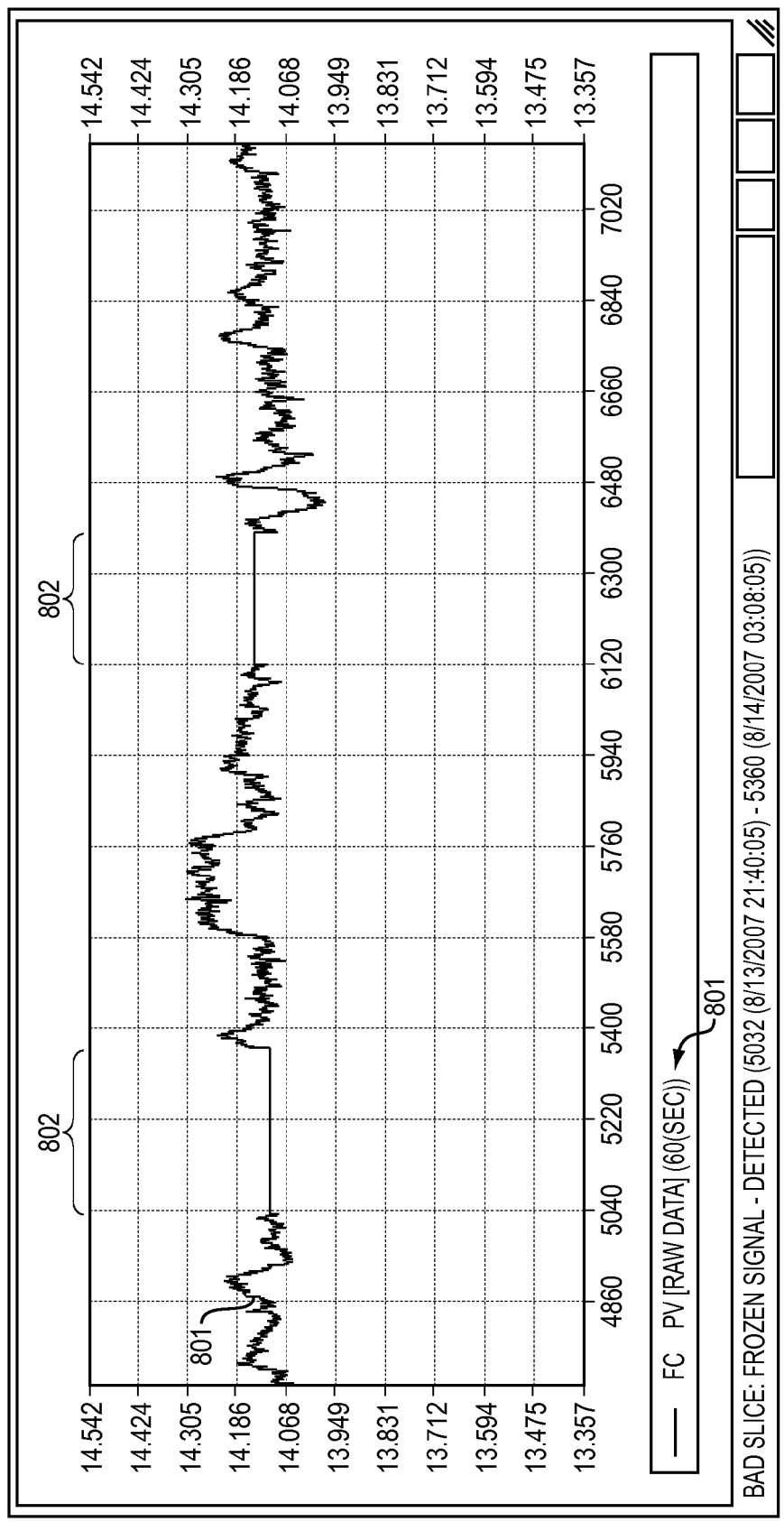
FIG. 8 is a schematic illustration of a data graph from which embodiments detect frozen signal/measurement.

A Frozen Signal/Measurement Detector:

If the given time series is a Dep (dependent variable), then any data segment with a frozen value will not be able to represent the CV response correctly and should be marked as "bad data" for model identification purposes. FIG. 8 shows an example of a PV signal 801 (measurement) that is frozen for more than one TTSS (Time to steady state) in data regions 802. In one embodiment, TTSS=60 minutes. The Frozen Signal/Measurement detector detects for such data/signal patterns.

Figure 12:
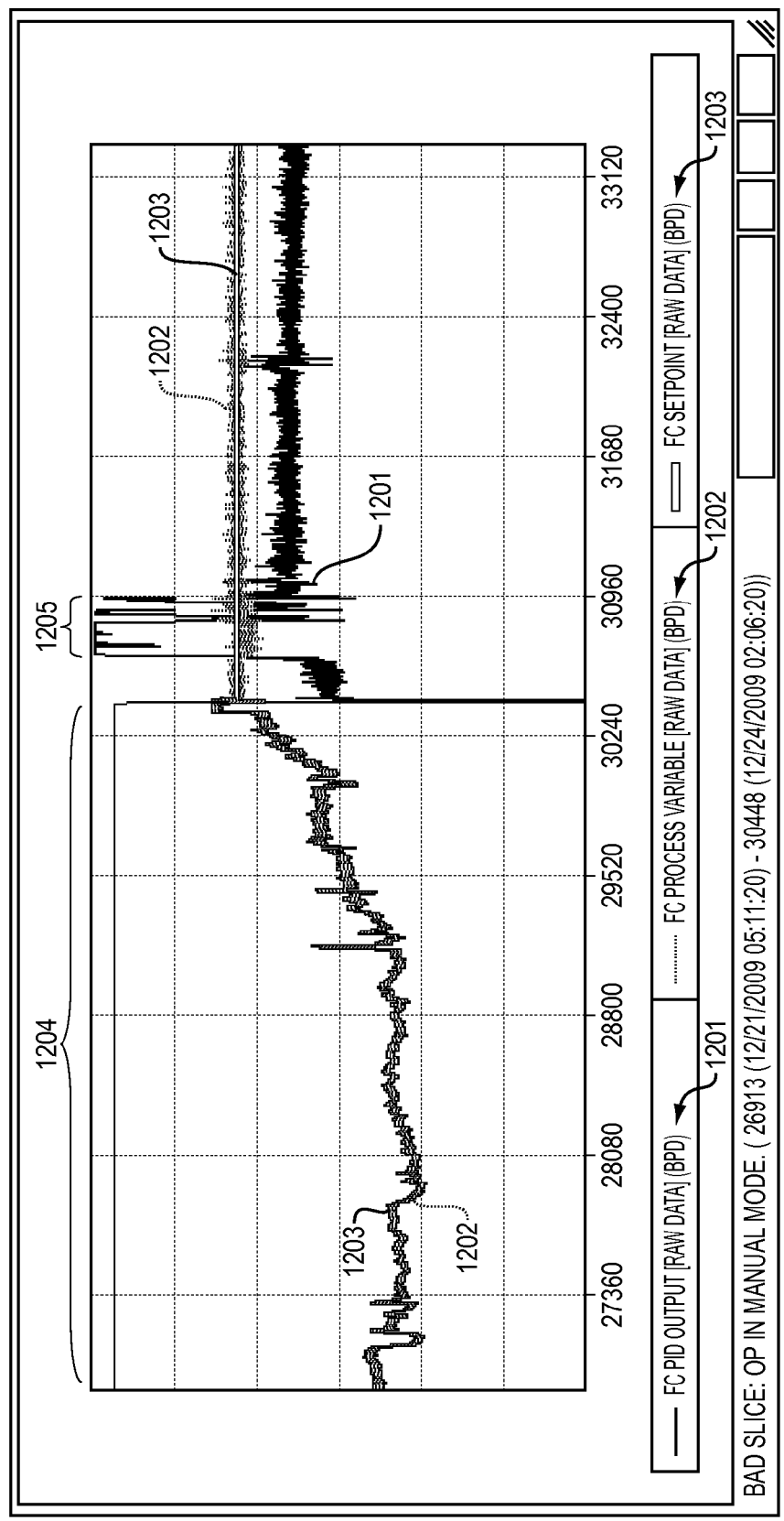
FIG. 12 is a schematic illustration of a data graph from which embodiments detect when a PID loop output has been switched to manual mode and the corresponding set point is now tracking the process variable.
Figure 17:
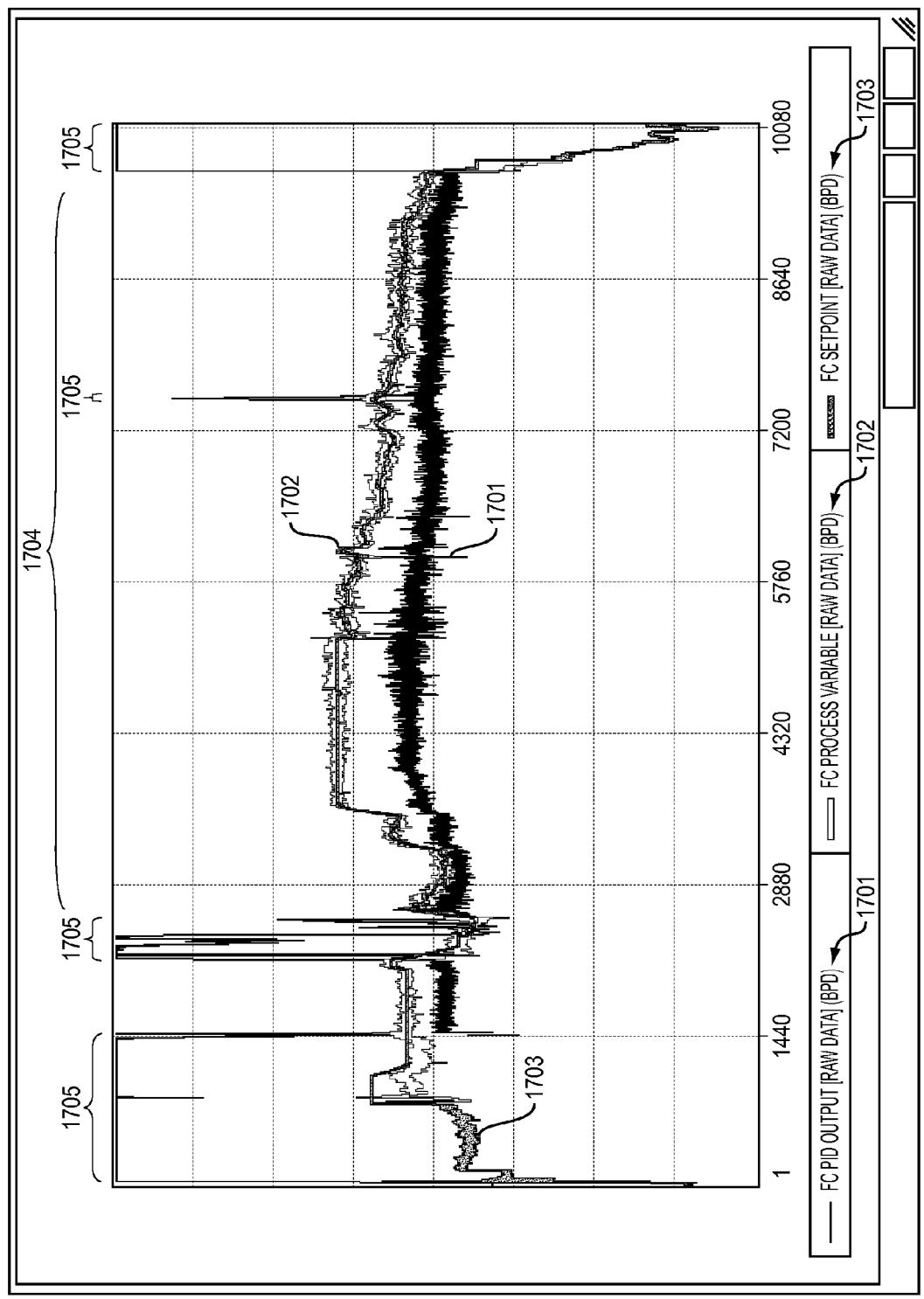
FIG. 17 is a schematic illustration of a data graph from which embodiments determine the subset of data where PID modes were correctly maintained and no saturation occurred.

A PID Manual Mode Detector:

If the given time series is an Ind (independent variable) and it is also a SP (set point) in its PID loop, when the PID loop is in MAN (manual) mode, the SP will track the PV (process variable) while the actual process independent variable (typically a valve opening position or flow rate) is changed by operator through an OP. In such a case, any readings from the SP value cannot represent the true relationship between INDs and DEPs. FIG. 12 illustrates an example of a PID loop in manual mode data range 1204 that was detected automatically by the PID Manual Mode Detector where PV 1202 overlaps setpoint 1203 while output 1201 is constant. As a comparison, FIG. 17 shows a graph from which embodiments determined the subset of data 1704 where PID modes were correctly maintained and no OP (PID output) 1701 saturation 1705 occurred. In the detection region 1704, SP 1703 is tracking PV 1702.

Figure 10:
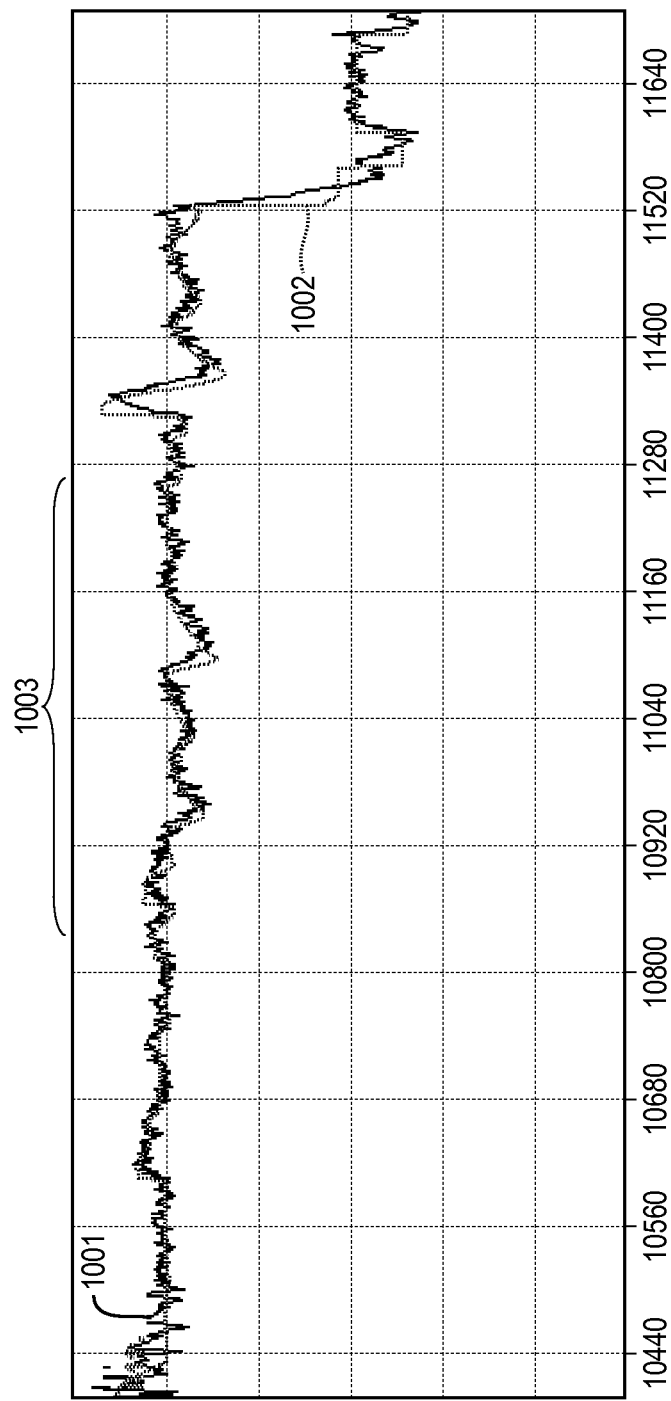
FIG. 10 is a schematic illustration of a data graph from which embodiments detect when a PID loop is in cascade for a sufficiently long period of time to conclude that this data will degrade the accuracy of model identification results.

A SP in Closed-Loop Mode Detector:

If the given time series is an independent variable and it is also a SP (set point) in its PID loop, when the PID loop is in Cascade mode, the SP will follow an external variable such as an OP from the outer PID loop. In such cases, if there is no clean step-moves for a long time, the data segment of the SP will become unsuitable for model identification. FIG. 10 indicates a situation when the SP 1002 was detected in Closed-Loop mode in data region 1003 following variable 1001.

Figure 13:
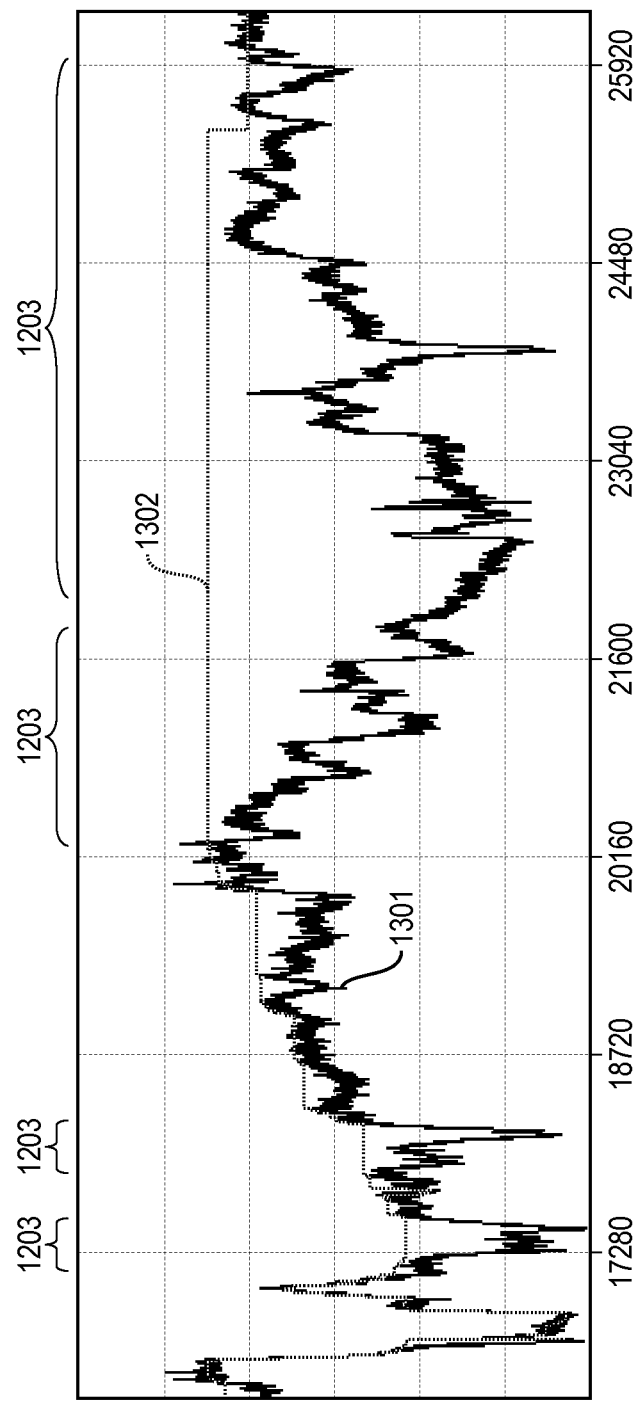
FIG. 13 is a schematic illustration of a data graph from which embodiments detect whether the PID process variable is not broadly following the set point trend and is moving in an opposite direction.
Figure 14:
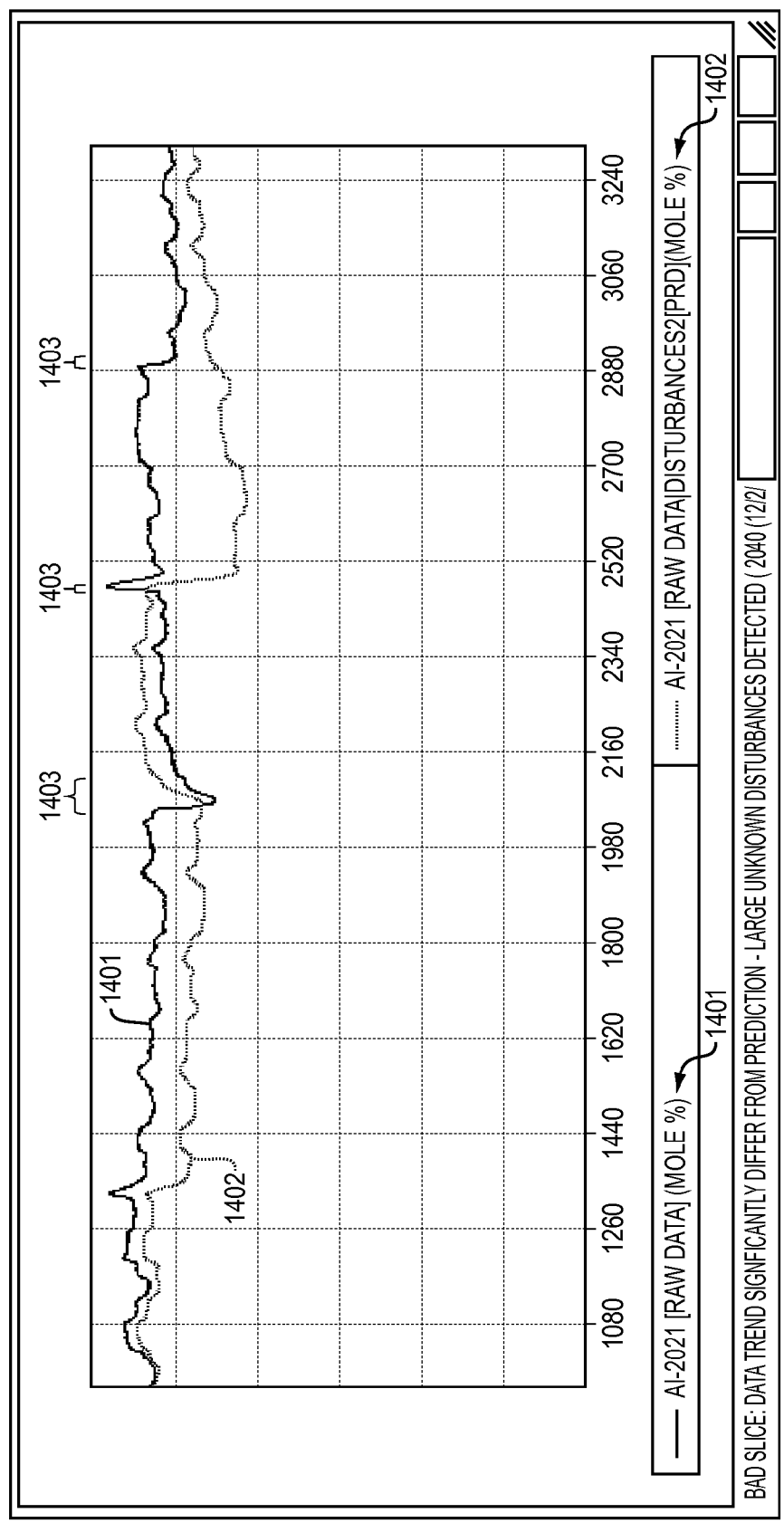
FIG. 14 is a schematic illustration of a data graph from which embodiments detect whether controlled variables do not show parallel movement to the predictions.
Figure 15:
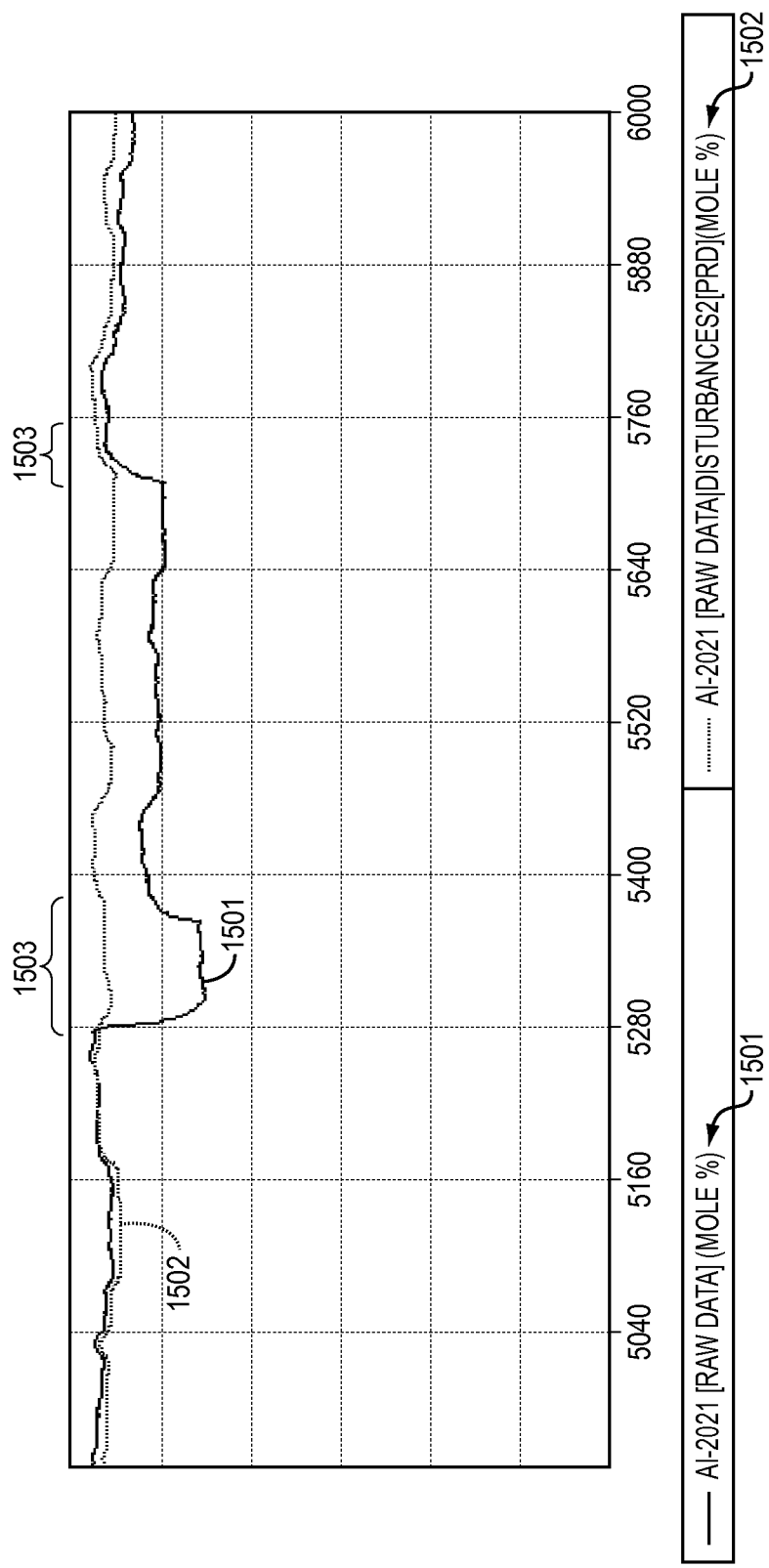
FIG. 15 is a schematic illustration of a data graph from which embodiments detect that a large sustained shift in the average value of a controlled variable (CV) has occurred outside of the normal movement, which is not explained by the CV prediction indicating a missing independent variable.

A Trend Mismatch/Unknown Disturbances Detector:

In addition to all cases and data screen and selection strategies discussed above, there are still cases where a DEP or CV time series may show significant sudden jumps/drops or slowing, but constant ramp ups/downs. In such cases, the DEP or CV is responding to unknown disturbances in the process 120 (e.g., missed FF (feed forward), unknown process disturbances, etc.) and the data segment becomes non-causal and will create negative impacts on model identification if the data is used. FIG. 13 shows detected data ranges 1203 where a PV 1301 is not broadly following SP 1302. FIG. 14 shows examples where the CV measurements 1401 contain several jumps where the model predictions 1402 have no such matched changes and therefore are detected by the detector as a "bad data" slice 1403. Similarly, FIG. 15 shows CV measurements 1501 contain several drops where the model predictions 1502 have no such matched changes and therefore are detected by the detector as a "bad data" slice 1503.

A Slice Validation Module 270 Using MQ:

To minimize the data loss due to too many bad data sample segments being selected, an innovative approach/module 270 is provided to test and validate all candidate bad data segments before finalizing the bad data slices. The provided approach 270 is formed of the following steps:

Step 1:

Set all detected bad data slices as "candidate bad data slices", generate good data slices by excluding candidate bad data slices for each time series variable;

Step 2:

For each DEP (dependent variable), configure a MISO model identification case that takes all INDs as inputs and single DEP as output;

Step 3:

Apply all good data slices created in Step 1 to the configured MISO case in Step 2 for a subspace model identification run;

Step 4:

Use the dataset created in Step 1 do a Model Quality Assessment on the resulting MISO model from Step 3 and using the techniques described in the parent related application. Record the MQ index value, a KPI (key performance indicator), as a baseline value;

Step 5:

For each bad data slice among "candidate bad data slices", reset that data segment to a "good" data slice if it is not a data slice found in the basic data screening (e.g., value=−9999, −10001);

Step 6:

Use the dataset defined in Step 5, run a MISO case identification similar to Step 3 except for that one "candidate bad data slice" that was ignored (removed and treated as good data in Step 5);

Step 7:

Repeat Step 4, evaluate the identified MISO model in Step 6 by calculating the MQ index value with the same dataset used in Step 4, and record the KPI of the new model;

Step 8:

Compare the KPI value obtained in Step 7 with its baseline value calculated in Step 4; if the new KPI value is sufficiently close to its baseline value, e.g., |KPI(new)−KPI(baseline)|<ϵ (where ϵ is a tunable threshold), then the negative impact of the selected/tested "candidate" bad data slice is not significant, and therefore the selected bad data slice is de-activated by being removed from the bad data slice list for model identification;

Step 9:

Move to next "candidate bad data slice" and repeat the validation process from Step 5 through Step 8 above until all candidate bad data slices are assessed and validated.

A Slice Reparation/Patch Approach/Module 280:

To minimize the data loss due to bad data sample segments, another innovative approach/module 280 is provided to repair and patch short candidate bad data segments before finalizing the bad data slices. One embodiment of the approach is described as follows.

Step 1:

Select a time series variable {x(t)}, all candidate bad data slices validated in Slice Validation Module 270 are screened, only those data slices with length less than a half time to steady-state (i.e., all bad data slices satisfying (Length<½ TTSS)), are selected for patch/fix;

Step 2:

If the selected time series is an IND (independent variable), loop through all selected candidate bad data slices in Step1 and do the following data patch:

(1) Assume the start index=Start, and the number of samples in slice=Length, then the slice ending sample index End=(Start+Length−1);

(2) Check the good sample values next to the two ends of the bad data slice to see if they satisfying |x(t=Start−1)−x(t=End+1)|<ϵ, where ϵ is a tunable threshold;

(3) If the condition in (2) is satisfied, create an "interpolation slice" with the following values generated by linear interpolation:

$$\{\hat{x}(t) = x_0 + k[x(t) - x_0(t)]\} \text{ where } x_0 = x(t = \text{Start} - 1), t = \text{Start}, \ldots, \text{End};$$

$$k = \frac{x(t = \text{End} + 1) - x(t = \text{Start} - 1)}{(\text{End} - \text{Start} + 2)}$$

(4) Replace the values of {x(t)} with interpolated values generated in (3) for the selected bad data slice.

Step 3:

If the selected time series is a DEP (dependent variable), configure a MISO case with this DEP and all INDs, apply all candidate bad data slices and run a model identification; use the identified MISO model and its input dataset generating model predictions on this DEP;

Step 4:

Loop through all selected candidate bad data slices in Step 1 (of Module 280) for the DEP, if the model predictive values generated in Step 3 (of Module 280) are available (predictive values may not always be available, e.g., due to model re-initialization after a bad data slice) for a candidate bad data slice, then an "interpolated slice" is created with the following equation:

$$\{\hat{x}(t) = x_{pred}(t)\} \text{ where } t = (\text{Start} - \text{TTSS}), \ldots, (\text{End} + \text{TTSS});$$

It is worthy to note that each of above interpolated slices consists of (2×TTSS) more samples than the corresponding bad data slice for a good connection (see below for details).

Step 5:

A special algorithm (described below) calculates two connection points for a flexible data slice patch which ensures the smoothness of the patch and minimizes the data loss;

Step 6:

Move to next candidate data slice and repeat the process 280 Steps 3 through 5 as above.

Figure 4:
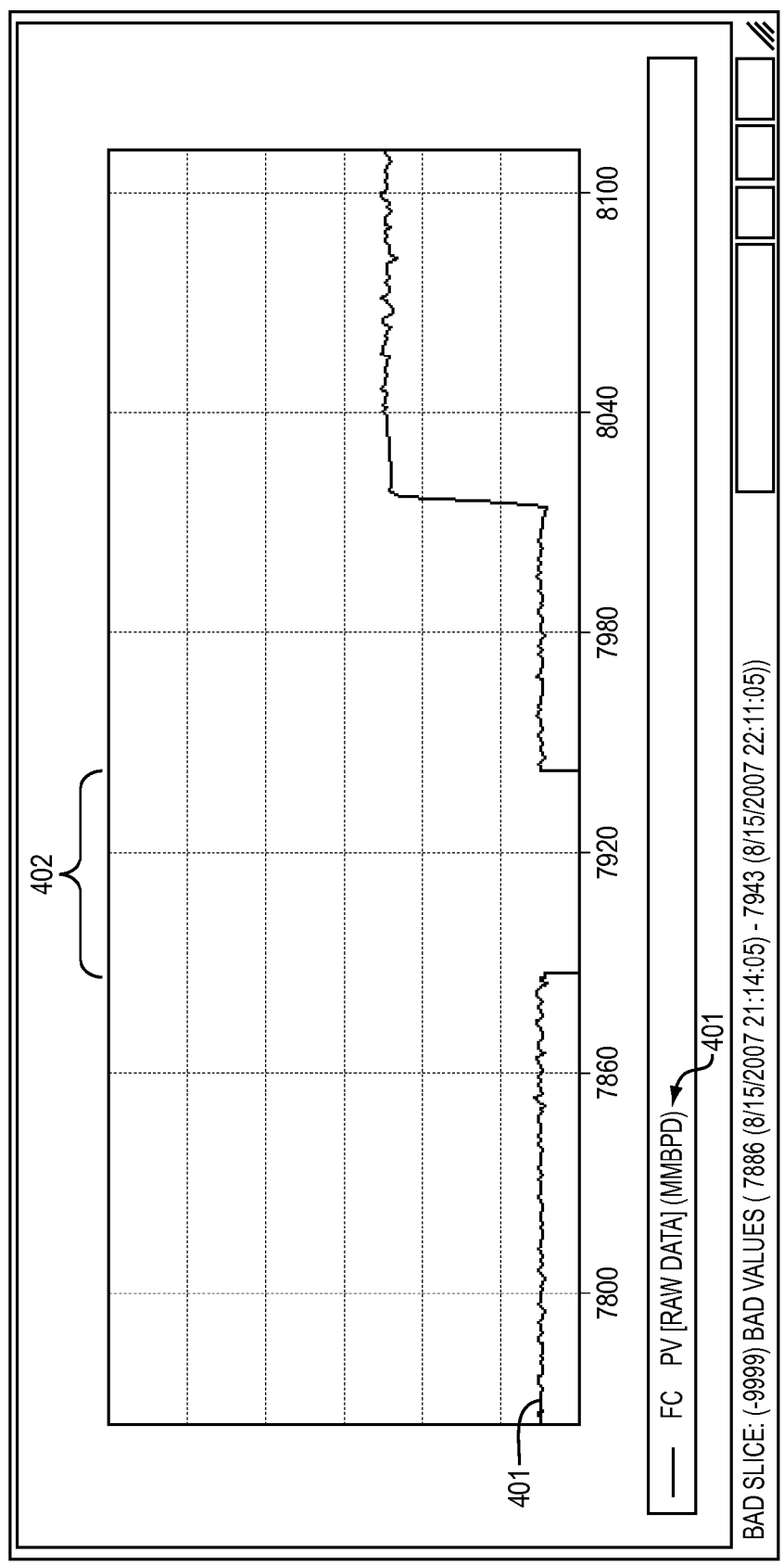
FIG. 4 is a schematic illustration of a data graph that embodiments automatically read plant test/operational data status and generate good and bad data segments.
Figure 5:
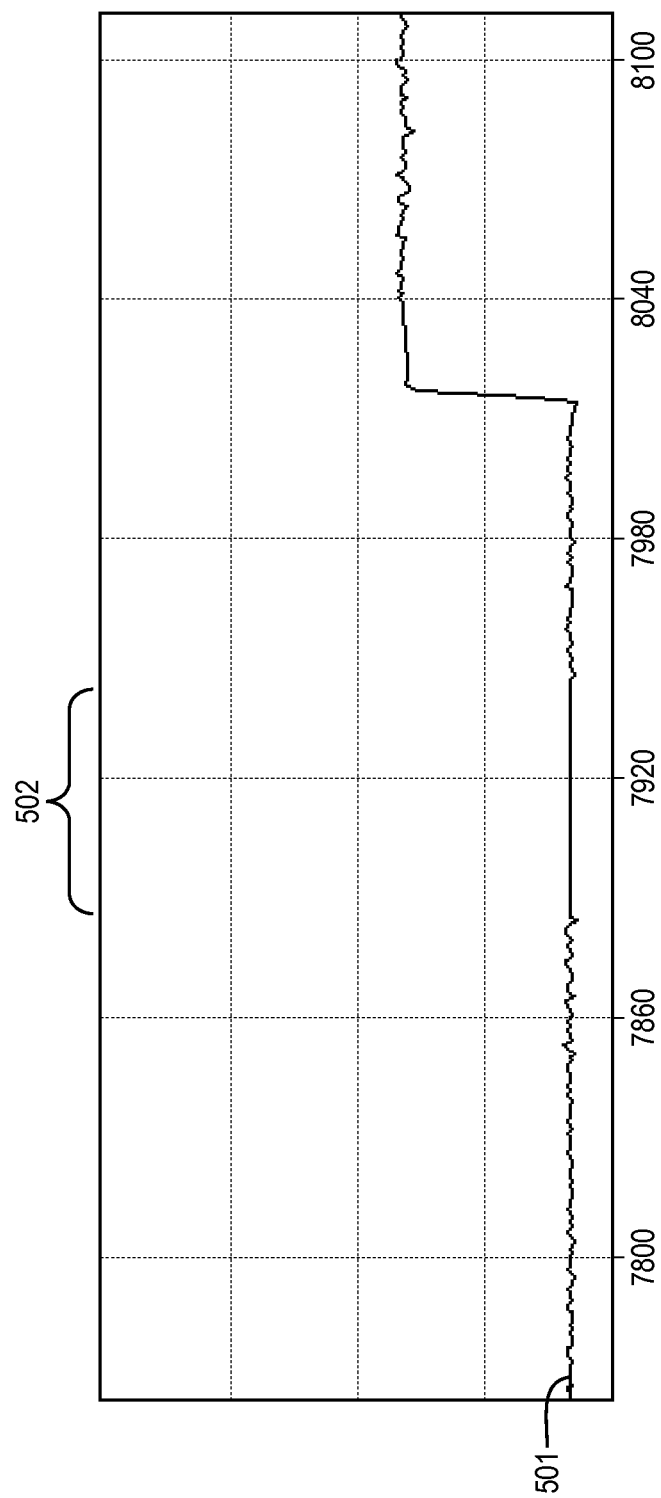
FIG. 5 is a schematic illustration of a data graph from which embodiments perform data repair to gaps in data, due to removal of bad data, by interpolation across remaining good data.
Figure 16:
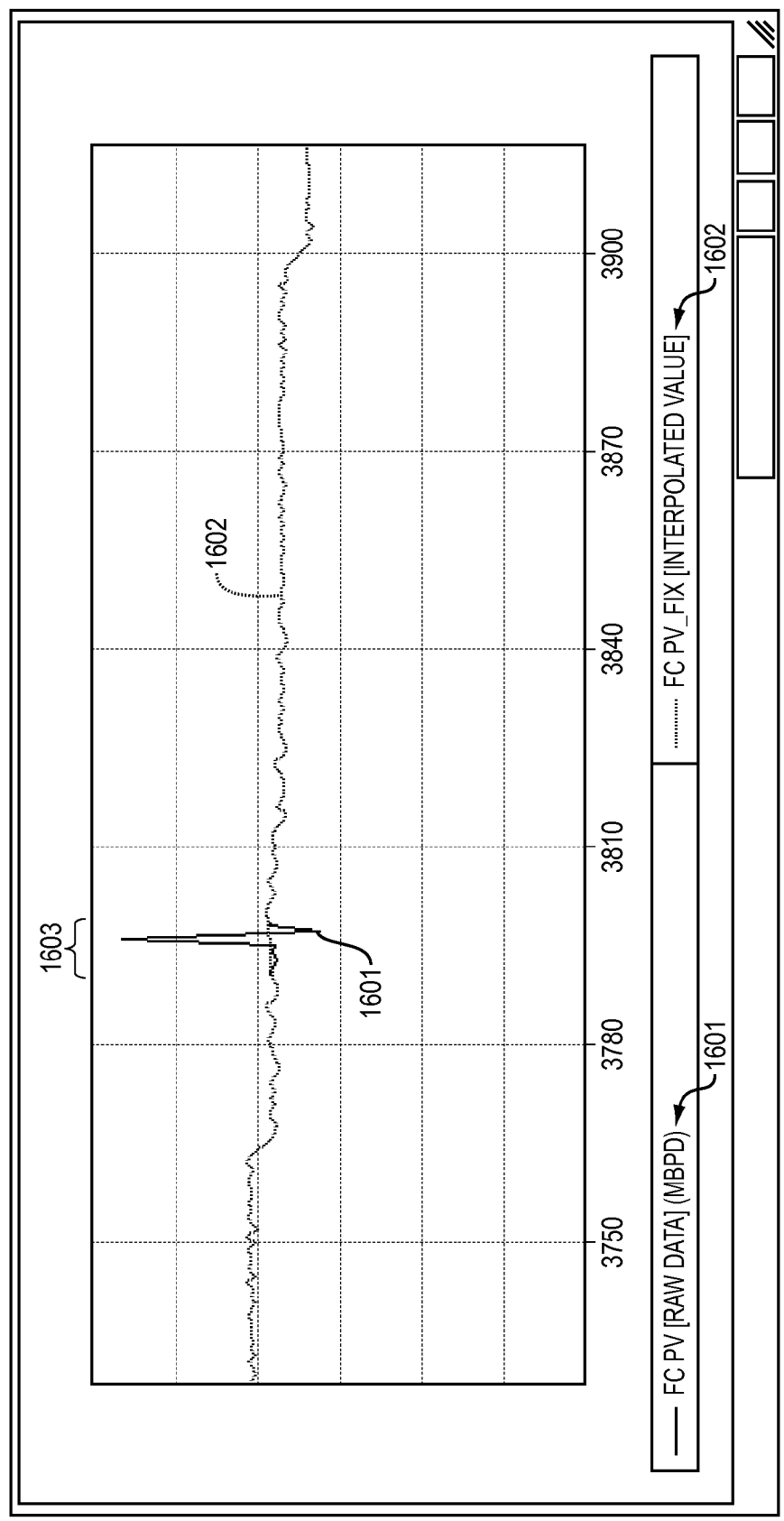
FIG. 16 is a schematic illustration of a data graph from which embodiments detect bad CV data and replace these bad data segments with predicted data without causing discontinuities in the repaired CV sequence.

An Algorithm for Slice Interpolation Connection:

To minimize the negative impacts of replaced bad data slices by interpolated data samples, a special algorithm is provided for a smooth connection between the two end points of a short bad data slice. FIG. 4 shows a time series of a process variable 401 and an associated segment of bad data 402. FIG. 5 shows the result of patching the same data segment of the process variable 501 with interpolated data segments in data range 502. FIG. 16 shows a PV time series 1601 with detected bad CV data 1603 and replaced bad data segments with predicted data 1602 without causing discontinuities in the repaired CV sequence. The algorithm is comprised of the following steps:

Step 1:

Read the user specified start point (UI_Start) and end point (UI_End) for a data slice patch from UI (default values UI_Start=Start, UI_End=End, are calculated for the data slice shown in FIGS. 5 and 16.)

Step 2:

UI_Start and UI_End points by examining the following:
If UI_Start ⊆ (Start−TTSS, End), UI_Start is Valid;
If UI_End ⊆ (Start,End+TTSS), UI_End is Valid.
If both UI_Start and UI_End are valid, then move to Step 3;

Step 3:

Calculate the Two Connection Points:

For smooth connection, two average values around the connecting points UI_Start and UI_End are used instead of two single measurement points. In the case of the underlying time series being noisy, the calculation below is particularly important and helpful to patching the bad data slice:

$$\bar{x}_{Start} = \sum_{t=t_0}^{t_0+n} x(t)$$

where $t_0$ = UI_Start − n and n = 10;

$$\bar{x}_{End} = \sum_{t=t_f}^{t_f+n} x(t)$$

where $t_f$ = UI_End − n

Figure 18A:
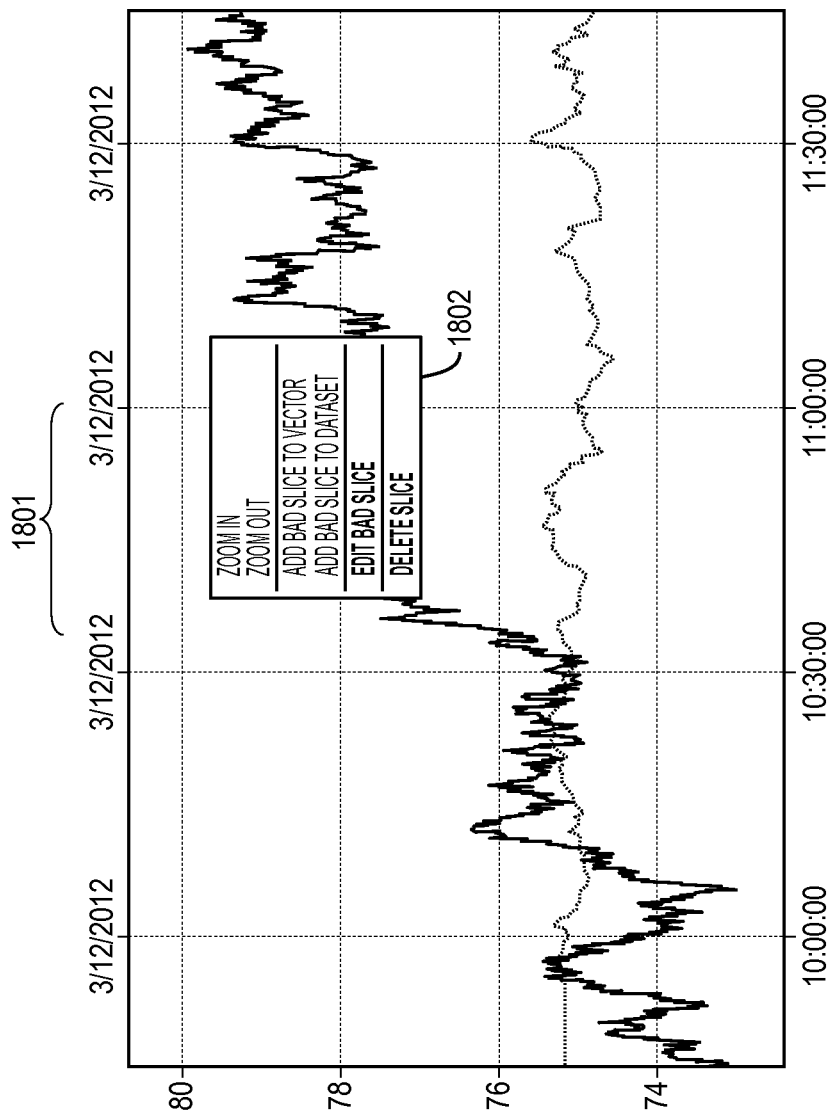
FIGS. 18A-C are schematic illustrations of a graphical user interface allowing users to add, delete and modify bad data slices in embodiments.
Figure 18B:
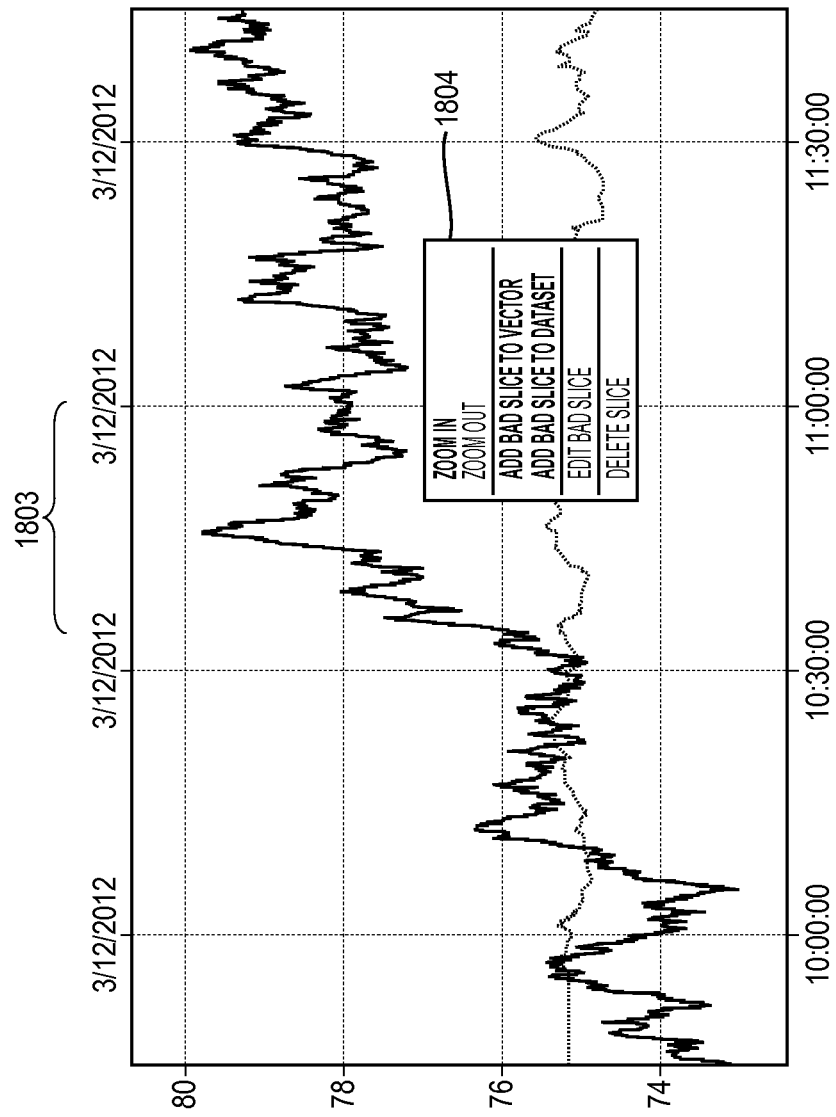
Figure 18C:
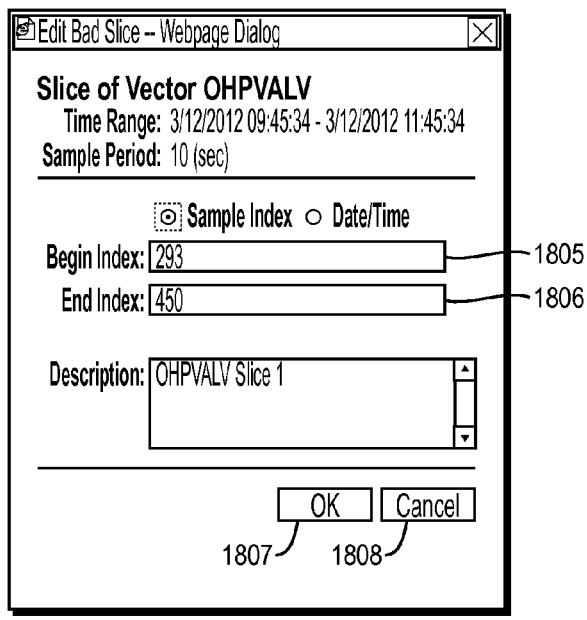

Step 4:

Calculate Interpolated Values:

To best patch a selected bad data slice, a set of model predictive values rather than a straight line (often used in the prior art), are filled into the data slice to replace the original undesirable values. Considering the possible bias between the model predictive values and the original measurements, and a possible data/prediction drafting during the time period over the slice, the following calculation with position adjustments is provided:

$$\Delta_{offset}(t)=\Delta_{offset}(t_0)\times(\Delta_{offset}(t_f)-\Delta_{offset}(t_0))\times(t-t_0)/(t_f-t_0);$$

$$\hat{x}(t)=\Delta_{offset}(t)+x_{PRED}(t);$$

with $\Delta_{offset}(t_0)=\bar{x}_{start}-x_{PRED}(t_0)$, and $\Delta_{offset}(t_f)=\bar{x}_{End}-x_{PRED}(t_f)$ A Graphical User Interface (GUI) and Algorithms to Allow Users Adding, Deleting and Modifying Slices Automated data selection apparatus and methods can help engineers prepare process data effectively, but it is still necessary and important to allow users to view, add, delete or edit the auto-generated bad data slices. A GUI (graphical user interface) or Web page and supporting algorithm (software) are provided in some embodiments to provide such functions. FIGS. 18A, 18B, and 18C illustrate the GUI. In FIG. 18A, the GUI 1802 allows a user to mark a data range 1081 by mouse clicks and add as a bad data slice to either a vector or a dataset (all vectors). FIG. 18B shows a GUI element 1804 (e.g., pop up menu) that enables the user to delete an existing bad data slice 1803 or edit it by opening a new dialog shown in FIG. 18C. FIG. 18C illustrates an example dialog box enabling editing of a data slice. Here the user is allowed to edit the bad data slice by re-typing Begin 1805 and End 1806 indexes (alternatively, Date and Time). Then the user confirms the changes by clicking on the OK button 1807, or, alternatively, cancels the changes by clicking on the Cancel button 1808. Other selection and confirmation configurations are suitable.

Figure 19:
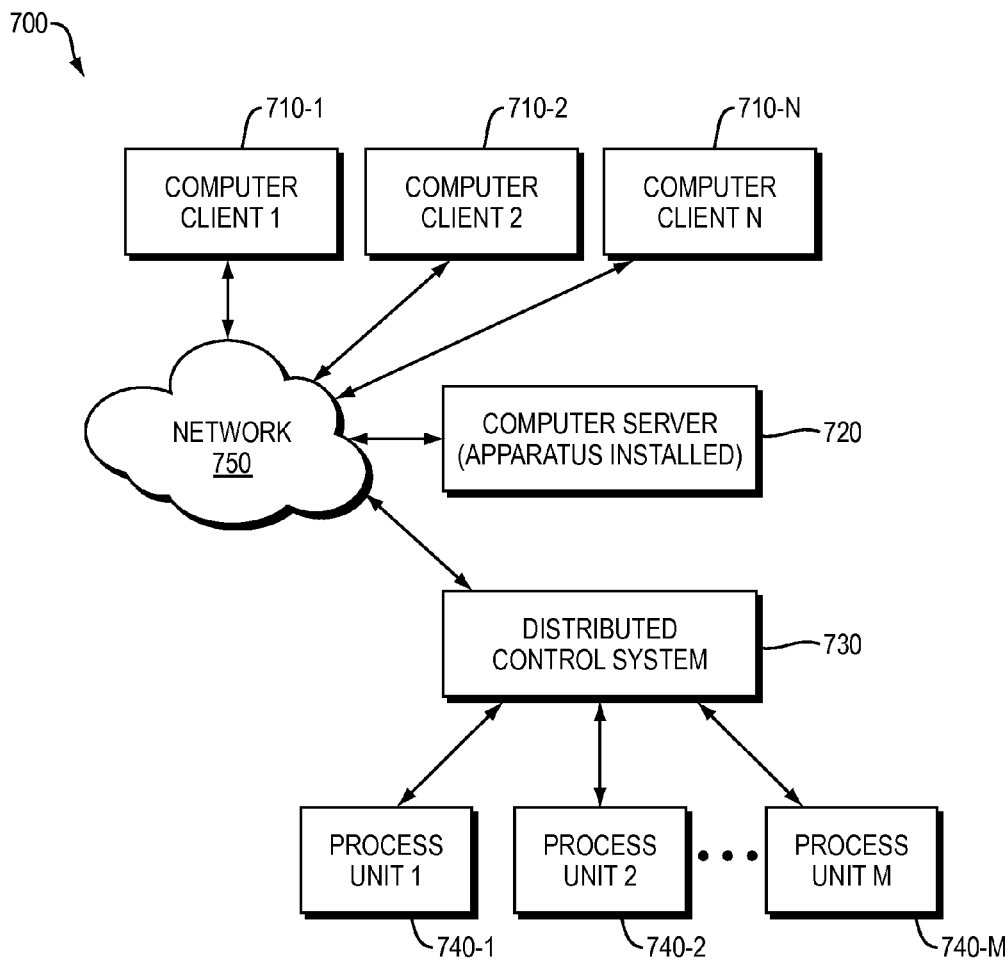
FIG. 19 is a block diagram of a computer network in which embodiments of the invention are implemented to serve one or more process units.

FIG. 19 illustrates a computer network and client-server environment in which embodiments of the present invention may be implemented. Client computer(s)/devices 710 and server computer(s) 720 provide processing, storage, and input/output devices executing application programs and the like. Typically, the present invention is installed as an apparatus in server computer 720. The server computer 720 and client computer(s)/devices 710 can be linked through communications network 750 to other computing devices, including other client devices/processes 710-1 and Distributed Control System (DCS) 730. Communications network 750 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

An example of implementation of the present invention may be as shown in FIG. 19 where the DCS system 730 controls one or more process units 740. An apparatus and method (e.g., process/modules 110, 140, 102, 200 and 300) described above is installed to run in the server computer 720. A user may access the server application from one or more client computers 710 that allow a remote connection through security and firewall in the network 750. A user may view, manage, change operations of one or more process units 740 through the DCS system 730. The described application may be configured by user from one or more client computers (710) and run in the server computer 720.

The present invention may be implemented in a variety of computer architectures. The computer network system 700 of FIG. 19 is for purposes of illustration and not limitation of the present invention.

Server computer 720 includes memory, a CPU (central processing unit) and the like. Memory provides volatile storage for computer software instructions and data used to implement an embodiment of the present invention (e.g., the controller 110, data screening and model identification 140, model adaptation, and supports processes 200, 300, GUI of FIG. 18, etc. as described above). Disk storage provides non-volatile storage for computer software instructions and data used to implement an embodiment of the present invention. The central processor unit provides for the execution of computer instructions. In one embodiment, the processor routines and data are a computer program product, including a computer readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the invention software instructions may also be downloaded over a cable, communication, and/or wireless connection or operable through a network portal.

While this invention has been particularly shown and described with references to example embodiments thereof, it will be understood by those skilled in the art that various changes in form and details may be made therein without departing from the scope of the invention encompassed by the appended claims.

What is claimed is:

1. A method of screening and selecting data automatically for model identification and model adaptation in a multivariable predictive controller (MPC), the method comprising:

given an online controller having an existing model, in a processor:

loading process data from a subject process and storing said process data in a database accessible by said model;

using a rule-based data selector, automatically detecting and excluding data segments of the stored process data that are unsuitable for model quality estimation and for model identification, the detecting and excluding comprising the steps of:
- (a) collecting process data variables and storing collected process data variables in said database at a given sampling frequency as time series variables,
- (b) loading data status, special values, and value limits of variables of the subject process with their corresponding time series from the database,
- (c) screening a given time series variable as a dependent process variable or an independent process variable and applying basic data screening filters to detect and mark data segments of the time series as Good Data or Bad Data according to given data quality measurement parameters,
- (d) grouping time series variables according to their associated proportional-integral-derivative (PID) loops,
- (e) comparing process variables (PV) against their corresponding set points (SP) in each PID loop and applying data screening filters,
- (f) generating predictions for dependent variables without a PID association using available independent variable measurements,
- (g) evaluating said generated predictions for dependent variables without a PID association against corresponding available dependent variable measurements and applying data screening methods, and
- (h) identifying and generating Bad Data slices in the given time series variable using the data segments marked as Bad Data and a data slice generator to exclude said Bad Data segments from the time series;

validating the excluded data segments to minimize the data loss from bad data segments being excluded;

repairing certain data segments of said stored process data to maximize usage of data in a MPC application; and updating said existing model using resulting process data as stored in the database.

2. The method of claim 1, wherein process data variables of step (a) includes at least one of manipulated variables (MVs), measurements of control variables (CVs) of the subject process, calculated values of independent variables, calculated values of dependent variables, all data vectors of the subject process, and all PID controller loops.

3. The method of claim 1, wherein the basic data screening methods of step (c) include at least one of a PID controller output (OP) saturation and High/Low limit detector, a frozen signal/measurement detector if the given time series is a dependent variable, and a PID manual mode detector if the given time series is an independent variable.

4. The method of claim 1, wherein the comparing process variables (PV) against their corresponding set points (SP) in each PID loop and applying data screening filters of step (e) comprises:

performing a PID loop association search and finding available SP, PV, and OP among all process variables, determining whether a PV and SP pair or a PV, SP and control output (OP) triple are associated with the time series in a PID loop, and if PV and SP pair or PV, SP and OP triple is associated with the time series in the same PID loop, using a rule-based data selector to apply data screening filters to detect data sequences showing deviations from their SP and marking the corresponding segments of data as Bad Data.

5. The method of claim 4, wherein the data screening filters include at least one of a PV spike detector if the given time series is a dependent variable, a PID manual mode detector, and a SP in closed-loop mode detector if the given time series is an independent variable.

6. The method of claim 1, wherein the evaluating said generated predictions for dependent variables without a PID association against their measurements and applying data screening filters of step (g) comprises:

if no PV and SP pair or PV, SP and OP triple is associated with the current time series variable in the same PID loop and the time series variable is a dependent process variable, using data screening filters to detect data segments showing spikes and deviations in moving trend and marking the corresponding segments of data as Bad Data according to given data screening filters.

7. The method of claim 6, wherein the data screening filters include at least one of a PV spike detector and a trend mismatch/unknown disturbances detector.

8. The method of claim 7, wherein a trend mismatch/unknown disturbances detector comprises:

generating a model prediction of the time series variable via a multiple-input single-output (MISO) model;

calculating a prediction error for unknown disturbances;

detecting if a control variable (CV) time series does not parallel the predicted MISO model values;

detecting if a large sustained shift in the average value of the CV has occurred outside of the normal movement and determining if it is associated with the model prediction; and selecting for exclusion the data segments of the time series variable showing difference in trends beyond the prediction error and making selected data segments as Bad Data.

9. The method of claim 1, wherein validating the excluded data segments to minimize the data loss from bad data segments being excluded comprises: the steps of,
- (i) testing Bad Data segments of said time series not removed by a basic data filter by comparing the model qualities (MQ) when said Bad Dada segments are included and excluded in the model identification; and
- (j) confirming Bad Data segments as Bad Data based on the MQ comparison, otherwise unmarking candidate Bad Data segments.

10. The method of claim 9 wherein testing Bad Data slices comprises:

setting Bad Data segments as Candidate Bad Data segments and generating Good Data segments by excluding Candidate Bad Data segments for each time series variable;

for a dependent variable, configuring a multiple-input single-output (MISO) model identification and loading the independent variables as inputs and the dependent variable as output in said MISO model;

applying said generated Good Data segments to the configured MISO model and calculating a baseline model quality index (MQ) by performing a model quality assessment on said MISO model; and running a MISO case identification on a Candidate Bad Data segment of said data segments not removed by a basic data filter and calculating a candidate MQ by performing a model quality assessment on said MISO model corresponding to the Candidate Bad Data segment.

11. The method of claim 10 wherein confirming Candidate Bad Data segments as Bad Data comprises:
given a tunable parameter as a threshold, marking Candidate Bad Data segment as a Good Data segment if difference between baseline MQ and candidate MQ is within said tunable threshold and removing corresponding data slices from a list of Bad Data slices.

12. The method of claim 9, wherein repairing certain data segments of said stored process data to maximize usage of data in a MPC application comprises: the steps of,
(k) for the given time series variable, selecting all confirmed Bad Data segments with length less than a half time to steady-state (TTSS) for interpolation;
(l) patching segments in the time series where data portions have been removed by the data slice generator with interpolated data segments; and
(m) minimizing the negative impacts of replacing Bad Data segments with interpolated data segments by patching Bad Data slices with their interpolated slices with a smooth connection between the end points of a interpolated data segments.

13. The method of claim 12, wherein steps (l) comprises:
if the time series variable is an independent variable, checking the Good Data segments adjacent to the selected Bad Data segments to determine if the Good Data sample values before a Start Point and after a End Point of a Bad Data segment are within a given threshold, and, if true, creating an interpolation slice by linear interpolation and replacing the selected Bad Data segments with the interpolation slice;
if the selected time series variable is a dependent variable, configuring a MISO model case with the dependent variable and associated independent variables, and running a MISO identification case using the resultant MISO model to generate a model prediction on the dependent variable, and creating an interpolated slice for Bad Data segments if model predictive values are available for the Bad Data segment; and
if the time series variable is a dependent variable, checking the Good Data segments adjacent to the selected Bad Data segments to determine if the calculated average values over a given length before the Start Point and after the End Point of a Bad Data segment are within the given threshold, and if true, creating an interpolation slice by linear interpolation and replacing the selected Bad Data segments with the interpolation slice, the interpolation slice smoothly connected to the Good Data segments.

14. An apparatus for screening and selecting data automatically for model identification and model adaptation in a multivariable predictive controller (MPC), the apparatus comprising:
a MPC coupled to a process system and having an existing model;
a computer processor executing routines in a working memory, the computer processor coupled to the multivariable controller;
a routine that accesses process data from a subject process and stores said process data in a database accessible by said model;
a routine that automatically detects and excludes data segments of process data that are unsuitable for model quality estimation and for model identification comprising
a routine that collects process data variables and storing collected process data variables in said database at a given sampling frequency as time series variables, the process data variables including at least one of: manipulated variables (MVs), measurements of control variables (CVs) of the subject process, calculated values of independent variables, calculated values of and dependent variables, all data vectors of the subject process, and all PID controller loops,
a routine that loads data status, special values, and value limits of variables of the subject process with their corresponding time series from the database;
a routine that, given a time series variable, determines the time series variable as a dependent process variable or an independent process variable and applies basic data screening filters to detect and mark data segments of the time series as Good Data or Bad Data according to given data quality parameters,
a routine that groups time series variables according to their associated proportional-integral-derivative (PID) loops,
a routine that compares process variables (PV) against their corresponding set points (SP) in each PID loop and applies data screening filters, the data screening filters including at least one of: a controller output (OP) saturation and High/Low limit detector, a frozen signal/measurement detector if the given time series is a dependent variable, and a PID manual mode detector if the given time series is an independent variable,
a routine that generates predictions for dependent variables without a PID association using available independent variable measurements,
a routine that evaluates said generated predictions for dependent variables without a PID association against said available independent variable measurements and applies data screening filters, and
a routine that generates Bad Data slices in the given time series variable using the data segments marked as Bad Data and excludes said Bad Data segments from the time series;
a routine that validates excluded data segments to minimize the data loss from bad data segments being excluded; and
a routine that repairs certain data segments of process data to maximize usage of data in a MPC application.

15. The apparatus of claim 14, wherein the routine that compares process variables (PV) against their corresponding set points (SP) in each PID loop and applies data screening filters comprises:
a routine that performs a PID loop association search among Good Data segments of the times series,
a routine that determines whether a PV and SP pair or a PV, SP and control output (OP) triple are associated with the time series in a PID loop, and
a routine that uses a rule-based data selector to apply data screening filters to detect data sequences showing deviations from their SP and marking the corresponding segments of data as Bad Data if PV and SP pair or PV, SP and OP triple is associated with the time series in the same PID loop, the data screening filters including at least one of: a PV spike detector if the given time series is a dependent variable, a PID manual mode detector, and a SP in closed-loop mode detector if the given time series is an independent variable.

16. The apparatus of claim 14, wherein the routine that evaluates said generated predictions for dependent variables without a PID association against said corresponding variable measurements and applies data screening filters comprises:
a routine that uses data screening filters to detect data segments showing spikes and deviations in moving trend and marks the corresponding segments of data as Bad Data according to given data screening filters if no PV and SP pair or PV, SP and OP triple is associated with the current time series variable in the same PID loop and the time series variable is a dependent process variable, the data screening filters include at least one of: a CV spike detector and a trend mismatch/unknown disturbances detector.

17. The apparatus of claim 14, wherein the routine that validates excluded data segments to minimize the data loss from bad data segments being excluded comprises:
 a routine that tests Bad Data segments of said time series not removed by a basic data filter by comparing the model qualities (MQ) when said Bad Dada segments are included and excluded in the model identification; and
 a routine that confirms Bad Data segments as Bad Data based on the MQ comparison, otherwise unmarking candidate Bad Data segments.

18. The apparatus of claim 14, wherein the routine that repairs certain time series to maximize usage of data in a MPC application comprises:
 a routine that selects all confirmed Bad Data segments with length less than a half time to steady-state for interpolation for the given time series variable;
 a routine that patches segments in the time series where data portions have been removed by the data slice generator with interpolated data segments; and
 a routine that minimizes the negative impacts of replacing Bad Data segments with interpolated data segments by patching Bad Data slices with their interpolated slices with a smooth connection between the end points of a interpolated data segments.

19. The apparatus of claim 14, further including:
 a display coupled to the computer processor for displaying process data and a visual interface for presenting process data to a user; and
 a user input device coupled to the processor enabling a user to modify and delete time series, data slices, and data segments of the process data.

* * * * *